US012578210B2

(12) United States Patent
Kantor et al.

(10) Patent No.: US 12,578,210 B2
(45) Date of Patent: Mar. 17, 2026

(54) METHOD FOR LOCALIZING PATTERNS IN A SIGNAL OF A POSITION SENSOR, AND POSITION SENSOR OR POSITION MEASURING DEVICE USING THE METHOD

(71) Applicant: Balluff GmbH, Neuhausen a.d.F. (DE)

(72) Inventors: Zoltan Kantor, Nemesvamos (HU); Attila Szabo, Iszkaszentgyorgy (HU); Tobias Konig, Esslingen (DE)

(73) Assignee: BALLUFF GMBH, Neuhausen ADF (DE)

( * ) Notice: Subject to any disclaimer, the term of this patent is extended or adjusted under 35 U.S.C. 154(b) by 351 days.

(21) Appl. No.: 18/511,325

(22) Filed: Nov. 16, 2023

(65) Prior Publication Data

US 2024/0133721 A1      Apr. 25, 2024

Related U.S. Application Data

(63) Continuation-in-part of application No. 18/377,965, filed on Oct. 9, 2023, now abandoned.

(30) Foreign Application Priority Data

Oct. 18, 2022    (DE) .......................... 102022127283.4

(51) Int. Cl.
    *G01D 5/48* (2006.01)
    *G01B 7/00* (2006.01)
(52) U.S. Cl.
    CPC ............. *G01D 5/485* (2013.01); *G01B 7/003* (2013.01)
(58) Field of Classification Search
    CPC ........... G01D 5/485; G01D 5/48; G01B 7/003
    See application file for complete search history.

(56) References Cited

U.S. PATENT DOCUMENTS 6,775,321 B1      8/2004  Soma et al.
2005/0114053 A1*  5/2005  Southward ............. G01R 29/02
                                                                702/66

(Continued)

FOREIGN PATENT DOCUMENTS

DE          102018117285 A1      1/2020

*Primary Examiner* — Eman A Alkafawi
*Assistant Examiner* — Suresh K Rajaputra
(74) *Attorney, Agent, or Firm* — GableGotwals

(57) ABSTRACT

In the method and the device described here for operating an electromagnetic, in particular magnetostrictive, or acoustic position measuring device (10) having at least one position sensor (44), at least one position encoder (20) and a waveguide (14), said position measuring device having a control device for triggering an interrogation pulse in the waveguide (14) and an evaluation unit for evaluating a wave form (400-450) recorded by the position sensor (44), wherein the time between the triggering of the interrogation pulse and the point in time at which the wave form (400-450) recorded by the position sensor (44) is recorded is measured to determine the position of the position encoder (20) via the relationship between distance and time, it is in particular provided that position recognition is implemented by means of the position encoder (20) by localising patterns in the wave form (400-450) recorded by the position sensor (44), wherein the localisation of such patterns is implemented on the basis of correlation observations and wherein a cross-correlation pattern characterising the position encoder (20) is transformed into another pattern that enables autonomous position recognition of the position encoder (20) by means of machine learning.

18 Claims, 15 Drawing Sheets

(56) References Cited

U.S. PATENT DOCUMENTS

| 2007/0139137 A1* | 6/2007 | Muniraju | G01D 5/485 |
| | | | 333/141 |
| 2018/0128655 A1* | 5/2018 | Beutler | G01D 5/485 |
| 2020/0025594 A1* | 1/2020 | Kántor | G01D 5/485 |

* cited by examiner $$stdev^2 = stdev^{*2} + stdev_0^2$$

METHOD FOR LOCALIZING PATTERNS IN A SIGNAL OF A POSITION SENSOR, AND POSITION SENSOR OR POSITION MEASURING DEVICE USING THE METHOD

CROSS-REFERENCE TO RELATED APPLICATIONS

This application is a continuation-in-part application of U.S. patent application Ser. No. 18/377,965 filed 9 Oct. 2023 which claims priority to German Patent Application No. 10 2022 127 283.4 filed 18 Oct. 2022, each of which is incorporated herein by reference.

BACKGROUND OF THE INVENTION

The invention relates to the operation of a position sensor or of a position measuring device comprising such a sensor, and in particular to the localisation of patterns in a measurement signal of such a position sensor or of a position measuring device comprising such a position sensor.

Prior Art

A magnetostrictive position measuring device comprising one or more position sensors working by magnetostriction that is for example relevant here emerges, for example, from DE 10 2018 117 285 A1, and comprises a waveguide made of a magnetostrictive material and an electronic circuit for applying an interrogation current pulse to the waveguide itself or to a conducting wire in the event of an initialisation signal. The conducting wire is fed through a slot of the tubular waveguide to generate a temporary magnetisation of the waveguide. At least one target magnet is further provided that is arranged near the waveguide and generates an initial magnetisation of the waveguide. The existing magnetisation is overwritten in the process by a new magnetisation that is induced by the interrogation current pulse. A torsional wave packet is thus generated that propagates in both directions along the waveguide. A measurement pick-up that is arranged near to the end of the waveguide comprising the electronic circuit serves to transform the torsional wave of the waveguide into an electronic signal. A damping zone/structure is further arranged on the other end of the waveguide to prevent or to reduce the reflection of the torsional wave on this end of the waveguide.

Due to the structure of such a measurement device, the torsional wave packet, and thus the corresponding electronic signal pattern, have a typical form. The time that is measured between when the interrogation pulse is triggered and the point in time at which the corresponding electronic pattern is detected is used to determine the position of the target magnet via the relationship between distance and time, wherein the wave propagation speed is used as a proportionality factor between these two physical variables. The position recording task is thus transformed into a time measurement task.

Ultrasonic distance sensors or corresponding position measuring devices have additionally become known, which typically comprise an ultrasound transmitter for transmitting an ultrasound wave packet if an initialisation signal is present. In this case too, in place of a specified target magnet, a target object that can be recorded via ultrasound is provided, the position or the distance of which should be determined. The ultrasound wave propagates in a suitable medium at a particular speed. By means of an ultrasound receiver, the received ultrasound signal is transformed into an electronic signal. The then present electronic signal is also evaluated by means of an electronic circuit.

In the case of ultrasonic distance sensors, too, the ultrasound transmitter emits an ultrasound wave packet in response to an initialisation signal, wherein the wave packet propagates over the medium to the target object at which the wave packet is reflected or scattered back to the ultrasound receiver again over the medium, and is transformed into an electronic signal by the ultrasound receiver. The time measured between the ultrasound wave packet being triggered and the point in time at which the corresponding received electronic signal pattern is detected is used here too for the purpose of determining the position of the target object or the distance between the ultrasound transmitter and the target object. The determination is implemented via the correlation between distance and time, wherein the wave propagation speed is used as a proportionality factor between these two physical variables. The ultrasound transmitter and the ultrasound receiver can form one assembly or a single ultrasound device having the specified dual function. Here too, the position or distance recording task is transformed into a time measurement task.

It should be noted that the time measurement in an ultrasound sensor system in question can also be implemented in another embodiment, e.g., in the form of a liquid velocity measurement of a flowing liquid, specifically by measuring the apparent running time of a specified ultrasound wave packet between an ultrasound transmitter and an ultrasound receiver across the flowing liquid.

BRIEF SUMMARY OF THE INVENTION

The object of the invention is to specify a method or a device for operating a position sensor or a position measuring device comprising such a sensor, which enables the target position of a target object, e.g., of a target magnet, to be recorded or measured at the highest resolution possible. The operation with or the adaptation to the largest possible number of target objects that can be recorded electromagnetically or magnetically or by ultrasound or the like, and their identification and diagnosis, should additionally be enabled.

The method according to the invention or the device are based on the evaluation of recorded measured signals on the basis of correlation observations or techniques. According to the prior art, in such evaluation techniques only a parabolic or linear fit to only approximately parabolic or linear sections of a cross-correlation or quasi auto-correlation of recorded wave forms is implemented.

The invention is based on the idea of transforming such a cross-correlation pattern of a target object into another pattern, which enables, in particular with autonomous machine learning, the position of a target object in question to be recognised as easily as possible and yet still reliably.

In the method suggested here for operating an electromagnetic, in particular magnetostrictive, or acoustic position measuring device comprising at least one position sensor, at least one position encoder and a waveguide, or an acoustic position measuring device that does not necessarily have a waveguide, said position measuring device comprising a control device for triggering an interrogation pulse in the waveguide and an evaluation unit for evaluating a wave form recorded by the position sensor, wherein the time between the triggering of the interrogation pulse and the point in time at which the wave form recorded by the position sensor is recorded is measured to determine the position of the position encoder via the relationship between distance and time, it is in particular provided that position recognition is implemented by means of the position encoder by localising patterns in the wave form recorded by the position sensor, wherein the localisation of such patterns is implemented on the basis of correlation observations and wherein a complex cross-correlation wave form characterising the position encoder is transformed at least into another wave form.

Such a complex cross-correlation waveform can alternatively or additionally be converted into an envelope and into instantaneous or currently existing phase waveforms. In contrast, the prior art works with time-dependent, real physical quantities, corresponding electrical signals, their digital/numerical representations and other derived time-dependent data.

From high-frequency (RF) technology, vibration analysis, acoustics and seismology, it is known to characterize the envelope of a time-dependent signal or a time-dependent "waveform", or the instantaneous size of a physical quantity as a function of time. The analogy between an envelope of a computer-based representation of an acoustic oscillation and an envelope of a time-dependent oscillation itself is therefore quite familiar or known to the average person skilled in the art concerned here.

Also phase waveforms mentioned above are known per se in the prior art, but their application according to the present inventive approach is not.

According to U.S. Pat. No. 6,775,321 B1 (Mani Soma et al.) "Device and method for measuring a jitter", the analytical signal z(t) of a real signal x(t) consists of the real signal as its real part and the Hilbert Transformation of the real signal as its imaginary part. In equation (12) disclosed therein, the instantaneous phase waveform $\phi(t)$ of the real signal x(t) is described as an arctan function of the ratio between the imaginary and the real part of the analytical function. The current phase signal is processed (see FIG. 20 there) to eliminate its discontinuities at the odd multiples of Pi( ) by adding a corresponding integer multiple of Pi( )(see FIG. 21 there). Further evaluation is carried out by a linear curve fit to the continuous instantaneous phase waveform, with the aim of precisely determining the temporal variation of the (original) real signal x(t).

The analytical signal disclosed in U.S. Pat. No. 6,775,321 B1 corresponds to a complex cross-correlation waveform. However, it has to be noted that, according to the terminology mentioned there, technical terms such as "signal", "function" and "waveform" are not clearly differentiated from one another.

In the method suggested, it can be provided that an autonomous position recognition of the position encoder is carried out by means of machine learning using the transformed wave form.

In the method suggested, it can further be provided that a complex cross-correlation is generated between a reference wave form created in advance of the position measuring device starting and a wave form recorded by the position sensor, wherein wave forms recorded by the position sensor can be updated after every request by means of the interrogation pulse and wherein a repeated sampling of the position encoder at an empirically pre-determined rate can begin synchronously with the onset of the interrogation pulse. It should here be noted that although the entire generated complex cross-correlation generated does not need to be stored, its corresponding data points must be temporarily stored.

In the suggested method, it can further be provided that a complex cross-correlation is generated between a complex or real reference wave form created in advance of the position measuring device starting and a wave form recorded by the position sensor.

In the suggested method, it can further be provided that a real reference wave form is generated by learning a targeted section of the recorded wave form, and specifically by using a window function, and/or that a complex reference wave form is generated from a/the learned real reference wave form as its real part and from the Hilbert transform of the real reference wave form as its imaginary part.

In the suggested method, it can further be provided that the imaginary part of a complex reference wave form is cross-correlated with the recorded wave form, and specifically as an imaginary part of the complex cross-correlation wave form, or that the real part of the complex reference wave form is cross-correlated with the recorded wave form, and specifically as a real part of the complex cross-correlation wave form.

In the suggested method, it can further be provided that the imaginary part of the complex cross-correlation wave form is generated via a Hilbert transform of the cross-correlation of the real wave form with the recorded wave form.

It should here be noted that a complex cross-correlation wave form can be generated such that a complex reference wave form is cross-correlated with a recorded wave form. All further evaluation steps, however, can be carried out correspondingly if the complex cross-correlation wave form is determined from the cross-correlation of a real or actual reference wave form and the recorded wave form as its real part, and from the Hilbert transform of the real part, specifically as its imaginary part.

If such a complex reference wave form is used to generate a complex cross-correlation wave form, synthetic, i.e., complex 5-point and complex 2-point reference wave forms can be used, which were not generated via machine learning or using the Hilbert transform. In this case, the imaginary part of the complex cross-correlation wave form is thus not identical to the Hilbert transform of its real part. In this embodiment of the suggested method, low-resource microcontrollers can advantageously also be used.

In the suggested method, it can further be provided that interrogation noise caused by the interrogation pulse can be excluded from a wave form recorded by the position sensor by discarding wave form data that is influenced by interrogation noise or by replacing corresponding wave form data with zero.

In the suggested method, it can further be provided that the reference wave form is created by extracting and storing a target wave form from a recorded wave form, wherein the two ends of the stored target wave form can be suppressed. The suppression of the two ends of the stored target wave form can optionally be implemented by using a window function, in particular a tapering cosine window having a parameter that ensures that the central part of the wave form remains substantially unchanged.

Alternatively, the target wave form can also be cut out of the recorded wave form such that the target wave form data is approximately zero on both ends. If a complex reference wave form is used, the latter can for example be created from the target wave form as its real part and from the Hilbert transform of the target wave form as its imaginary part.

In the suggested method, it can further be provided that an envelope curve and a current phase of the cross-correlation wave form are determined. For example, the Hilbert transform of the cross-correlation wave form is calculated, wherein the complex cross-correlation wave form has the cross-correlation wave form as a real part and the Hilbert transform of the cross-correlation wave form as an imaginary part.

In the suggested method, it can further be provided that the complex cross-correlation wave form is calculated by means of at least one FIR filter, wherein correspondingly filtered wave form data is calculated from temporally previous wave form data.

In the evaluation unit also suggested for operating an electromagnetic, in particular magnetostrictive, position measuring device comprising at least one position sensor, either at least one position encoder and a waveguide, or an acoustic position measuring device, said position measuring device comprising a control device for generating an interrogation pulse (e.g., in the waveguide) and an evaluation unit for evaluating a wave form delivered by the position sensor, in particular calculation means for generating a complex reference wave form and for calculating the position of the at least one position encoder are provided according to the method suggested herein.

In the suggested evaluation unit, two FIR filters working in parallel can be provided to calculate a complex cross-correlation wave form, wherein sampling values of a recorded wave form pass through the two FIR filters, and wherein the real parts and the imaginary parts of elements of a complex reference wave form comprise coefficients of the two FIR filters to generate the real or imaginary parts of the complex cross-correlation wave form.

It should here be noted that the suggested evaluation unit for generating the complex reference wave form and for calculating the position of the position encoder can have a parallel logic gate arrangement or architecture in the form of an FPGA (Field Programmable Gate Array). It should be noted, however, that other logical architectures or circuits, e.g., microcontrollers, can be used for the specified calculation steps. The specified logic circuits can also enable a real-time operation or a real-time evaluation of the recorded wave forms, which can even be carried out in parallel with the recording of wave forms, e.g., when using a conventional microcontroller, in particular when using a specified filter architecture comprising two FIR filters working in parallel.

The likewise suggested position measuring device for electromagnetic, in particular magnetostrictive, or for acoustic position measurement comprising at least one position sensor, at least one position encoder and optionally a waveguide, which has a control device for generating an interrogation pulse in the waveguide and an evaluation unit for evaluating a wave form delivered by the position sensor, has in particular a specified evaluation unit.

According to the method according to the invention or the device, a complex cross-correlation between a complex reference wave form and a recorded wave form is thus generated. The complex reference wave form is generated in advance of the position measuring device starting and is stored in a non-volatile data storage device.

Wave forms recorded in this way are updated after every request. A correspondingly repeated sampling of a target object begins at a rate "fs" synchronously with the onset of a request or "init" signal specified in the introduction, wherein the sequence of corresponding, already digitalised measured values of an electrical recording signal "Us" detected by a measurement pick-up specified in the introduction can also be temporarily stored in a storage device.

According to the invention, it is made possible on the one hand to locate a suitable linear section of the current phase of the complex cross-correlation wave form and to localise the respective target object by determining the level transition times. The approach according to the invention in particular also works reliably at low sampling frequencies.

The method according to the invention or the device offer the following advantages in relation to the prior art:

- even higher resolution measurement or recording of the position of a target object;
- reliable operation with an almost unlimited number of target objects;
- improved adaptivity to different target objects and an optimal operation with differently designed target objects;
- multi-target recording or a simultaneous operation with different target objects;
- a reduced minimum permissible distance of a target object from the waveguide;
- enabling an even lower A/D conversion rate;
- a simplified sensor design and thus a corresponding cost advantage;
- a significantly reduced shock sensitivity or a correspondingly higher resistance to shock and vibration;
- a lower probability of phantom target recognition;
- a signal and data reliability display or diagnosis that is reliable during operation;
- easy learning of new target objects or target objects with an incorrect alignment in relation to the waveguide;
- reliable recognition of approaching target objects with high measurement resolution; and
- simultaneous recording of position, distance (z) and rotational angle of a target object (e.g., target magnets).

BRIEF DESCRIPTION OF THE DRAWINGS

Exemplary embodiments of the invention are depicted in the drawings and are explained in more detail in the following description.

DETAILED DESCRIPTION OF THE INVENTION

Figure 1:
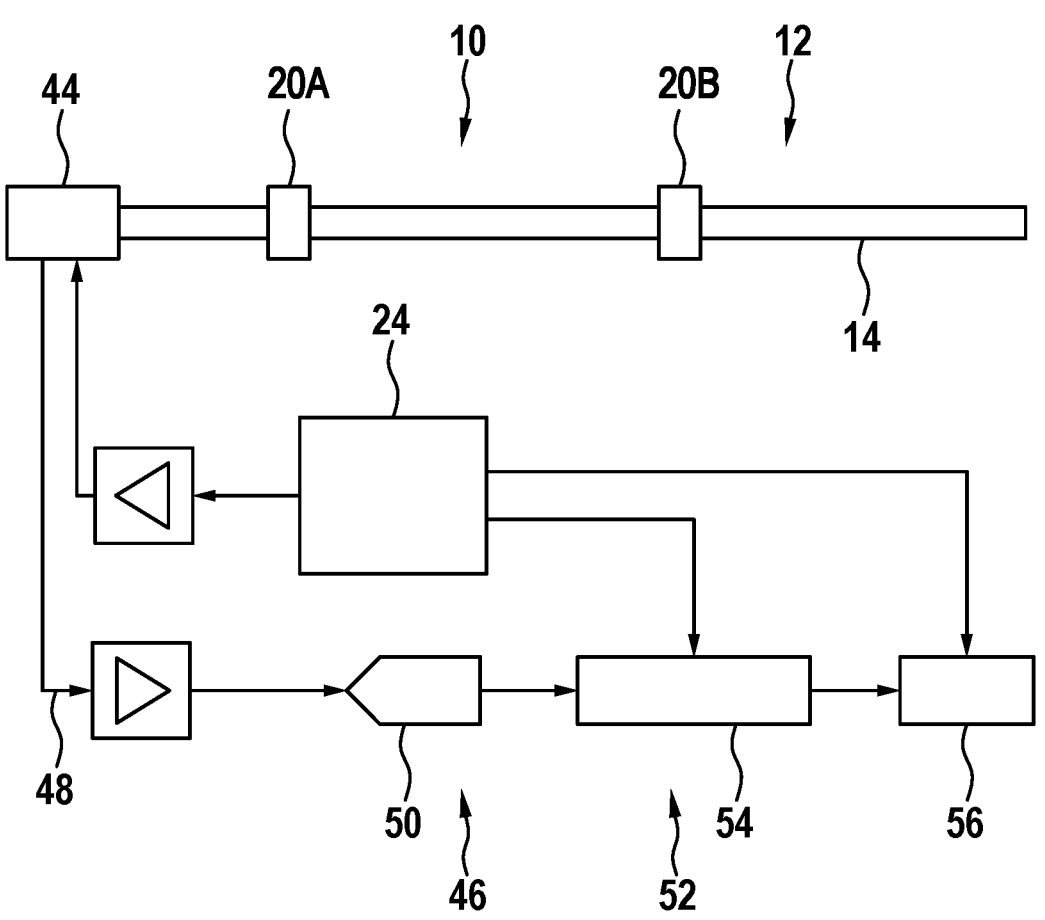
FIG. 1 shows a schematic depiction of a magnetostrictive position measuring device known per se for use of the method described herein and which has two magnetic position encoders in this example.
Figure 2:
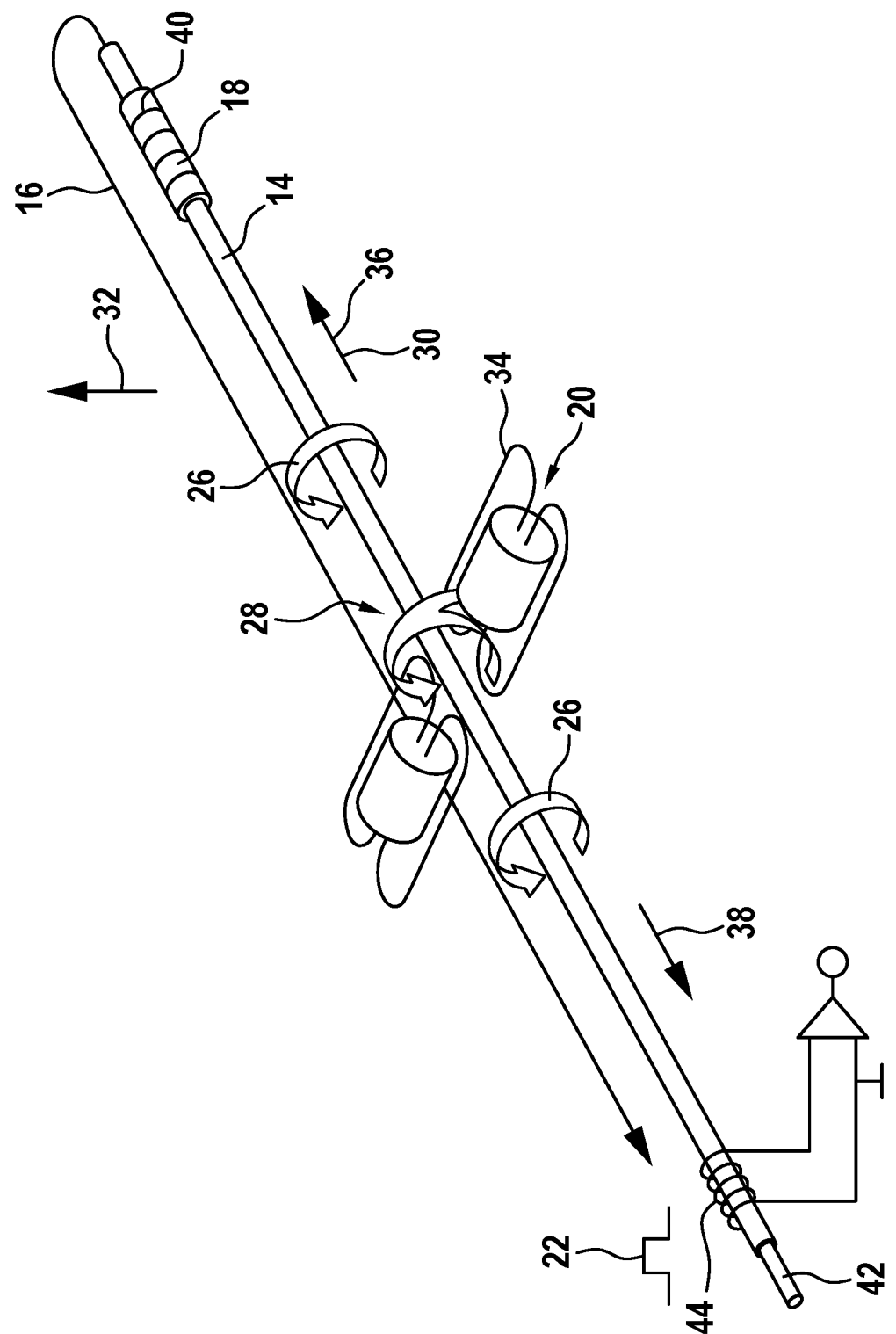
FIG. 2 shows a schematic depiction of a waveguide of a measuring device shown in FIG. 1 for explaining its mode of functioning.

A magnetostrictive position measuring device that is schematically shown in FIG. 1 and labelled 10 comprises a measurement pick-up (or position sensor) 12 comprising a waveguide 14. A return guide 16 is assigned to the waveguide 14 (FIG. 2). A damping element 18 is further assigned to the waveguide 14, said damping element being positioned on an end region of the waveguide 14 (cf. FIG. 2). The magnetostrictive sensor device 10 comprises one or more magnetic position encoders 20 (also described as "target magnet" in the following") (FIG. 2) or 20A, 20B (FIG. 1). The magnetic position encoder(s) 20 couple with the measurement pick-up 12 without contact.

Such a magnetostrictive sensor device or apparatus functions in principle as follows (see FIG. 2): An excitation current pulse 22 starting from a measuring interface triggers a measurement as a measurement signal. The excitation current pulse 22 is triggered by means of a start signal. A control device 24 (FIG. 1) initiates the application of start signals. The excitation current pulse 22 on the waveguide 14, which is for example a wire waveguide, generates a circular magnetic field 26. Due to soft magnetic properties of the waveguide 14, this magnetic field 26 is bundled into said waveguide 14.

The magnetic position encoder 20 acts on the waveguide 14 at a measurement location 28 of the latter. The measurement location 28 characterises the position of the magnetic position encoder on the measurement pick-up 12. In principle, this position is a position in relation to a longitudinal direction 30 of the waveguide 14 (in a measurement range). In principle, however, it is possible, as explained in more detail in the following, that, as an alternative or in addition, the corresponding position is a position in a direction 32 transverse to the longitudinal direction 30. For example, in one embodiment, magnetic field lines 34 of the magnetic position encoder 20 run at a right angle to the circular magnetic field 26 and are likewise bundled into the waveguide 14.

In a region in which the circular magnetic field 26 and the magnetic field generated by the position encoder 20 overlap, an elastic, torsion-like deformation due to magnetostriction arises in the micro-region of the microstructure of the waveguide 14. This overlap region is the measurement location 28. The elastic deformation causes an elastic wave propagating along the waveguide 14 in opposite directions 36, 38. The directions 36 and 38 are in particular in parallel with the longitudinal direction 30 of the waveguide 14 (in a measurement region). A propagation speed of this wave in the waveguide 14 lies in particular in the range of approx. 2800 m/s and is substantially not sensitive to environmental influences.

The damping element 18 on one end 40 of the waveguide 14 damps away the wave running to this end 40, such that the part of the wave reflected back can substantially be neglected in signal detection in relation to the directly propagating wave. A detector coil device 44 comprising at least one pick-up coil (also described as a "measurement pick-up" in the following) is arranged on another end 42 of the waveguide 14. The detector coil device 44 generates an electrical signal by reversing the magnetostrictive effect by induction, and delivers said electrical signal to the measurement interface. The electrical signal, which is provided by the detector coil device 44, is an analogue signal, and in particular a voltage signal.

The wave running time from the place of creation to the detector coil device 44 is directly proportional to the distance between the position encoder 20 and the detector coil device 44. By means of a time measurement, the distance between the detector coil device 44 and the position encoder 20 can thus be determined with a high degree of precision, wherein the position of the position encoder 20 determines the measurement location 28. The primary measurement signal for the time measurement is the excitation current pulse 22, wherein the latter is triggered in turn by the start signal. The primary measurement signal is delivered to the measurement interface at a time delay depending on a distance between the detector coil device 44 and the position encoder 20 of the detection coil device 44.

With regard to the mode of functioning of magnetostrictive sensor devices (or magnetostrictive distance recording devices) in principle, reference is made to E. Hering, G. Schönfelder (publisher) "Sensoren in der Wissenschaft und Technik" [Sensors in Science and Technology], Wiesbaden, 2012, and in particular to chapter 3.1.5. Reference is further made to T. Burkhardt, A. Feinäugle, S. Fericean, A. Forkl, "Lineare Weg-und Abstandssensoren" [Linear Position and Distance Sensors], Verlag Moderne Industrie, Munich, 2004.

As already mentioned, the detector coil device 44 delivers analogue signals. It is provided that a temporal course of these signals (voltage signal) is determined, recorded and analysed. The signal form is in particular determined, recorded and analysed. A digitalisation device 46 (see FIG. 1) is provided that generates digital data from analogue data at a relatively high digitalisation rate (sampling rate). Analogue signals 48 of the detector coil device 44 are added to the digitalisation device 46 in an evaluation branch for this purpose. The digitalisation device 46 comprises an analogue-to-digital converter 50 that correspondingly generates digital data.

Figure 11:
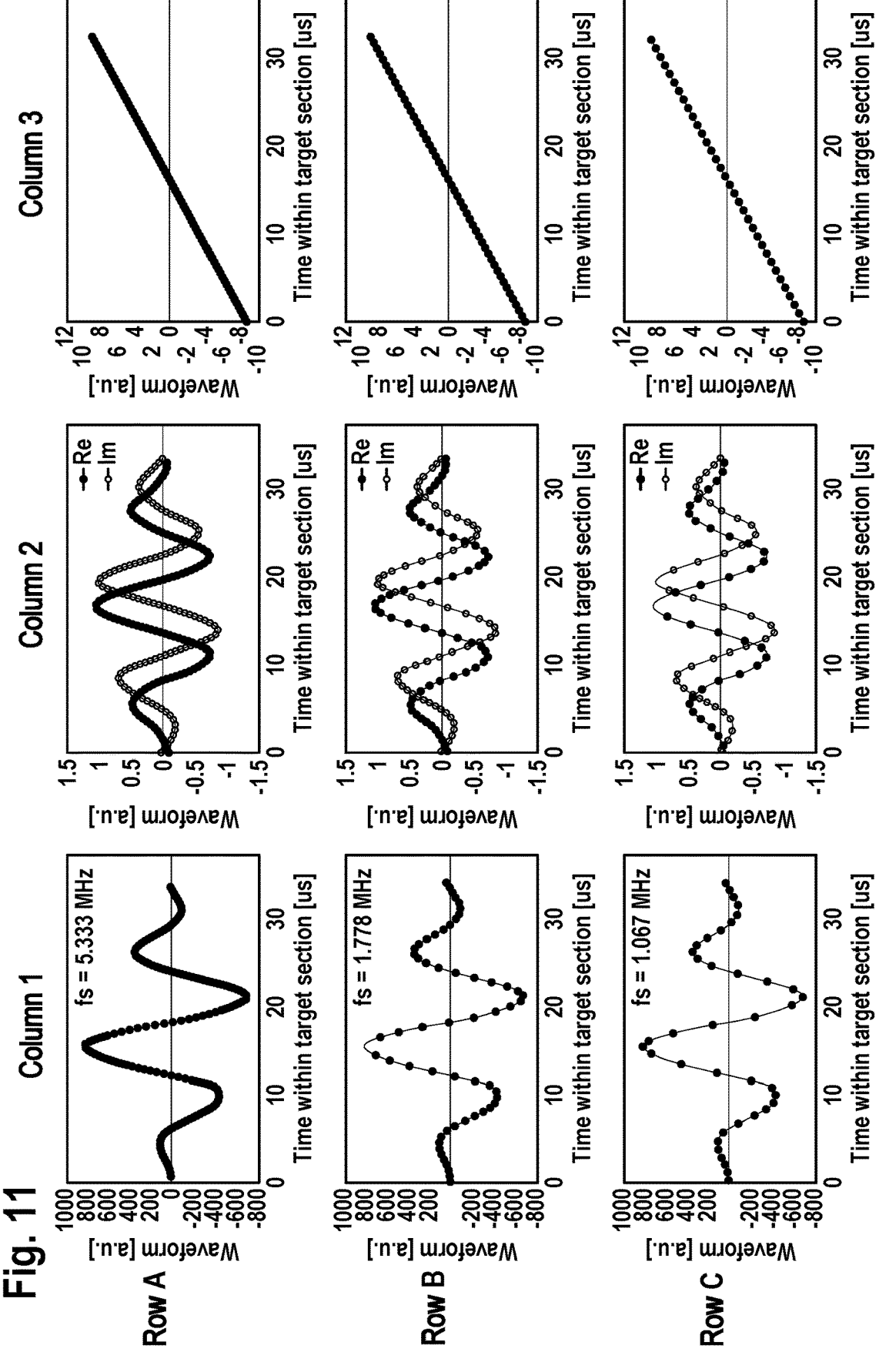
FIG. 11 shows the effect of the reduction of the sampling rate on a recorded target wave form, on a corresponding complex cross-correlation wave form and on the phase over time with reference to eighteen diagrams.

In a preferred embodiment, sampling frequencies between 1 and 3 MHZ are used, whereby the recorded waveforms thus received can even be processed in real time by means of a microcontroller known per se. Much lower sampling rates can also be used, however, or even much higher sampling rates. In the last case, a high-performance FPGA (Field Programmable Gate Array) can be used, whereby advantages result due to the processing precision that has thus been increased (see also FIGS. 11 and 12).

Via a data processing device 52, the form of the signal of the detector coil device 44 is determined in its temporal course. In a storage device 54 that is arranged downstream of the digitalisation device 46, the digitalised signals are then correspondingly stored as digital data. The data that has thus been stored characterises the temporal course of the signals of the detector coil device 44 in digital form. An analysis device 56 evaluates this data in its temporal course.

The control device 24 is coupled by signalling to the storage device 54 and to the analysis device and to the data processing device 52 as a whole. A correlation between start signals and stop signals can thus be produced. In particular, a correlation between the triggering of a measurement process and the measurement data can be produced. The storage device 54 is for example an array, a FIFO buffer and/or a ring buffer. The control device 24 is for example implemented in a DSP, an FPGA or in a microcontroller or in a combination thereof. In principle, the digitalisation device 46 and/or the storage device 54 can be integrated into the control device 24. The analysis device 56 can also be integrated into the control device 24. In one embodiment, the analysis device 56 is implemented via a DSP (Digital Signal Processor). In the storage device, the temporal course (including pulse form) can be provided per measurement cycle in digitalised form by signals of the detector coil device 44.

The magnetostrictive position measuring devices in question accordingly typically comprise:

a waveguide that is produced from the strongest magnetostrictive material possible;

a control device, e.g., an electronic circuit, for applying an interrogation current pulse in response to an initialisation signal ("init" signal in the following) to the waveguide itself or to a conducting wire that is guided through a slot of the tubular waveguide to generate a temporary magnetisation of the waveguide;

a target magnet(s) that is arranged near the waveguide and generates a starting magnetisation of the waveguide, wherein the magnetisation is overwritten by the magnetisation that is induced by the interrogation current pulse, whereby a torsional wave packet is generated that propagates in both directions along the waveguide;

a measurement pick-up that is arranged near the near end of the waveguide, i.e., near the electronics of the waveguide, to transform the torsional wave of the waveguide into an electronic signal;

usually, a damping zone/structure on the other end of the waveguide to prevent (or to damp) the reflection of the torsional wave on this end of the waveguide; and an electronic block that is arranged separately or can be designed as part of the specified electronic circuit for evaluating the electronic signal of the measurement pick-up.

Due to the technical structure of such a sensor device, the torsional wave packet, and thus the corresponding electronic signal pattern have a typical waveform. The period of time that is measured between the triggering of an interrogation current pulse and the point in time of the detection of a corresponding electronic pattern is used to characterise the position of the target magnet via the correlation between distance and time. The wave propagation speed is used as a proportionality factor between these two points in time. The position recording task is thus transformed into a time measurement task.

In the case of both magnetostrictive and ultrasound-based position or distance sensors, a measuring technique known per se consists of a counter being started in combination with the active flank of a specified "init" signal, wherein a comparator is provided to recognise a level crossing of the electronic output signal of the measurement pick-up. The time counter is then stopped when the comparator output is activated. The output of the comparator can be pre-conditioned or pre-adjusted by further comparators and sequential logic such that the counter is effectively prevented from stopping due to vibrations unrelated to the target, as the micro-electronically integrated and highly precise time counters usually used by the measuring devices in question can also react to false stops, i.e., not without loss of valid measurement data.

Via the spatial arrangement and the associated mechanical coupling of the measurement pick-up with the magnetostrictive waveguide, the electronic signal of the measurement pick-up is exposed to undesired mechanical disturbances such as shocks and vibrations, which propagate along the waveguide up to the specified "pick-up zone" that is dependent on the position of the measurement pick-up.

In relation to the magnetostrictive position measurement devices described, measurement devices are also known per se, which are based on the evaluation of a longitudinal magnetic effect of a torsional wave, and which are thus even more sensitive to the specified mechanical disturbances than the previously specified measurement devices which are exclusively based on torsional waves. This is because in the measurement devices last specified, said disturbances can be coupled into the waveguide from the mechanical environment with much lower efficiency.

In the simplified exemplary embodiment of a position measuring device comprising only one single target magnet 20 compared to the magnetostrictive position measuring device depicted in FIGS. 1 and 2, it should further be understood that the recorded wave form has a zero offset, i.e., that it substantially has a zero value in the absence of interrogation or outside of the time intervals that are influenced by the interrogation noise, target signals or their echoes, which can for example be implemented via sample-wise subtraction of a constant offset.

It is further assumed that the interrogation noise is excluded from a respectively recorded wave form by either discarding the wave form data that is influenced by the interrogation noise or by replacing the corresponding values with zero.

Figure 3A:
FIG. 3A-C show calculation steps according to the invention for producing a reference wave form on the basis of a wave form recorded metrologically by means of a position sensor in question.

A reference wave form is constructed in the following way. First, the production of a recorded wave form 300 is initiated (see FIG. 3A) and a target wave form 305 is copied in a buffer storage device, specifically according to FIG. 3B, wherein the two dashed lines 307, 307' shown there only indicate the ends or edge regions of the target wave form 305, which is substantially covered by the solid line of the initiated wave form 300 which is substantially coincident in the central region. The buffer storage device contains only one part of the originally recorded wave form 300, which also contain values 302 that are influenced by the presence of the target magnet 20, and not by the values 303, 304 substantially having the value zero and illustrated in FIG. 3A on the left and right-hand side. All values that are not equal to zero are generated due to noise and fluctuations, whereby these values can be determined either stochastically or systematically, e.g., due to the waveguide quality.

Figure 3B:
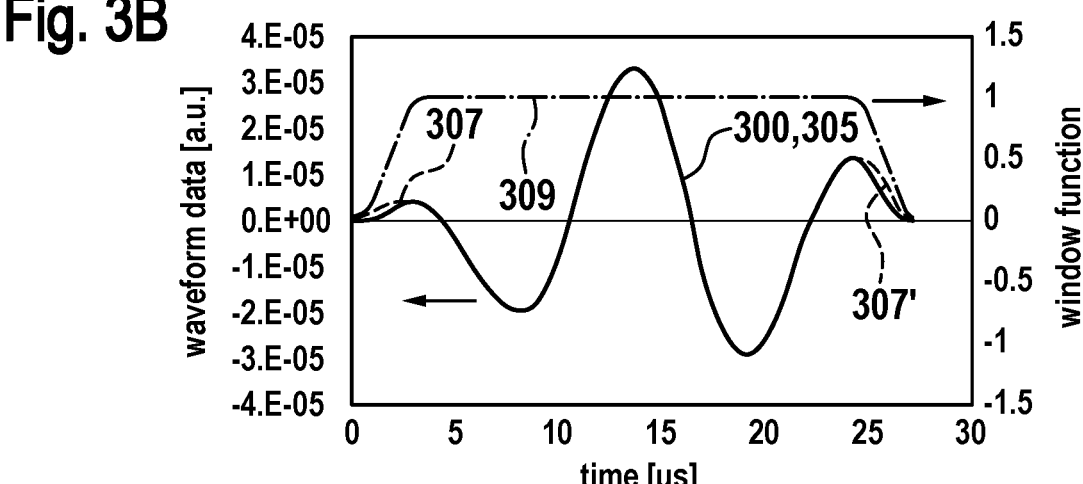

In the next step, both ends of the copied wave form are suppressed to guarantee a frictionless transition to values that are as close to zero as possible, specifically up to the end of the entire wave form, and specifically e.g., by using a "tapered cosine window" according to the dash-dotted line 309 depicted in FIG. 3B, and specifically having a parameter that ensures that the substantially central part of the wave form 305 remains unchanged, and specifically according to the solid line 305 depicted in FIG. 3B. This wave form 305 is presently used as a real reference wave form.

It should be noted that a specified window function 309 ("tapered cosine window") in the digital signal processing determines with what weighting the sampling values acquired when sampling a signal are included in the following calculations within such a section (window).

It should further be noted that it is possible to use alternative window functions known per se to suppress the two ends of the reference function, but without substantially changing their central region or their central part.

The specified target wave form preferably represents a narrowband "wavelet", i.e., an approximately sinusoidal wave form multiplied with an envelope curve. The same also applies to a specified, real reference wave form. This means that the depiction of the target wave form in the frequency space results in a distributed spectral peak value around a central frequency. As the amplitude spectrum of a cross-correlation function in question of two functions is represented by the product of the respective amplitude spectra of the two functions, the amplitude spectrum of the cross-correlation wave form will have a narrower peak than the amplitude spectrum of each of the two individual functions.

Figure 3C:
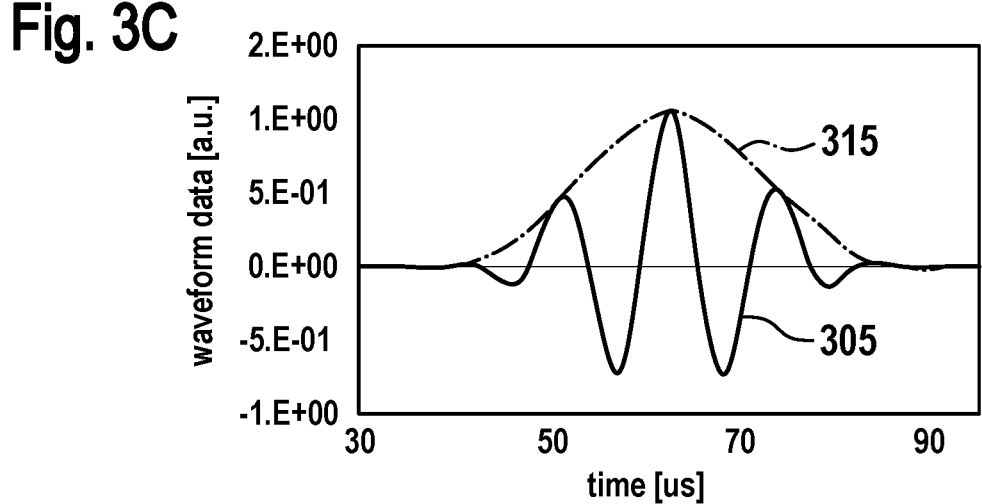

The cross-correlation wave form of the reference wave form and the recorded wave form can be described by an approximately cosine function multiplied with an approximately Gaussian envelope curve, as depicted in FIG. 3C by the dash-dotted line 315. The normalised cross-correlation wave form is depicted therein with a dashed line, which hardly appears visible, however, behind the solid line representing the best-fit function. The normalised cross-correlation wave form thus represents a Gaussian envelope curve (depicted by a dash-dotted line) as a product and a cosine function (not depicted).

As the relevant section of the cross-correlation wave form for the target magnet 20 can substantially be generated as a product of a Gaussian and a cosine function, this also means that the phase of the cosine component changes in a linear manner at every point in time as a function of the time. Consequently, the position that corresponds to a particular phase value in relation to the phase of the cosine component moves together with the target wave form. A linear fit to the data points can thus be calculated, whereby the cosine phase-time relationship or cosine phase-position relationship results that behaves in a linear manner and thus directly enables the localisation of the position of the target magnet 20.

The technical problem thus results that the locating of a zero crossing or of a maximum position of the cross-correlation wave form is made more difficult, as the corresponding "almost linear" or "almost parabolic" sections can only be treated as very approximately linear or parabolic, and in particular at lower sampling rates of the analogue-to-digital conversion, it is not obvious which data points can be used for the fit.

Contrastingly, the linear fit, proposed according to the invention, to the specified function cosine phase over time or position avoids the problem of selecting the correct data points for the specified fit, as this function is linear over the entire region of the cross-correlation wave form.

To determine the envelope curve and the instantaneous phase of the cross-correlation wave form, its Hilbert transform can be calculated and the complex cross-correlation wave form can be generated by using the cross-correlation wave form as its real part and the correlation wave form as its imaginary part. The envelope curve can be calculated as the absolute value of the complex cross-correlation function, and the instantaneous phase of the cosine component as the phase angle of the complex cross-correlation wave form.

However, the calculation of the Hilbert transform yields the further problem that the complete cross-correlation wave form needs to be stored, which requires a lot of technical effort for longer waveguides. Additionally, as the Hilbert transform can only be calculated after the complete measurement signal has been transformed, the evaluation of the measurement data is implemented in real time, i.e., in parallel with the recording of the wave form, whereby the evaluation results, i.e., the position data of the target magnet 20, are only available with a corresponding time delay.

The approach according to the invention is based on the relationship described, according to which the Hilbert transform of the cross-correlation of a reference wave form with a recorded wave form corresponds to a cross-correlation of the Hilbert transform of the reference wave form with the recorded wave form. The cause of the associativity of the two wave forms is that the Hilbert transform can be understood as a convolution, and the cross-correlation wave form can thus be correspondingly derived by back-calculation. As is known, convolutions in the time domain can additionally be transformed into corresponding multiplications in the frequency domain.

As already described, according to the approach according to the invention, the Hilbert transform of the actual or real reference wave form is calculated and the complex reference wave form is produced from a combination of the real reference wave form as its real part and the Hilbert transform of the real reference wave form as its imaginary part. On this basis, the complex cross-correlation wave form is calculated as a cross-correlation of the complex reference wave form with the recorded wave form.

The equivalence of the Hilbert transform of a cross-correlation waveform of a first waveform and a second waveform with a cross-correlation of the Hilbert transform of the first waveform and the second waveform is based on the following relationships, which are described or represented in the frequency space or in the frequency domain for simplicity.

Let $u=u(t)$ and $v=v(t)$ be two time-dependent functions and $u\otimes v$ be their cross-correlation function. In addition, let $H$ denote the Hilbert transformation. The Fourier transform of the Hilbert transform of any time-dependent real function $g(t)$ can thus be calculated according to the following relationship:

$$F(H(g))(\omega)=-i\,\mathrm{sgn}(\omega)F(g)(\omega),$$

where $\omega$ is the angular frequency. For the Fourier transformation of the cross-correlation of the two real functions u and v one can write:

$$F(u\otimes v)(\omega)=F(u)^*(\omega)F(v)(\omega),$$

where "*" means the complex conjugate of a complex number.

Thus, based on the two equations mentioned, the Fourier transform of the cross-correlation function can be written in the following form:

$$F(H(u\otimes v))(\omega)=-i\,\mathrm{sgn}(\omega)F(u\otimes v)(\omega)=-i\,\mathrm{sgn}(\omega)F(u)^*(\omega)F(v)(\omega)=-[i\,\mathrm{sgn}(\omega)F(u)(\omega)]^*F(v)(\omega)=-F(H(u)\otimes v)(\omega),$$

or correspondingly in the time domain:

$$H(u\otimes v)(t)=-(H(u)\otimes v)(t).$$

Regardless of the sign, the latter equation shows that the cross-correlation of the Hilbert transform of a first function and a second function can be used equivalently instead of the Hilbert transform of the cross-correlation of the two functions. This equivalence also applies to the respective digital waveforms.

The following describes how data elements of a waveform can be discretely indexed according to the sampling times. The conversion is done from discrete indices and the time, by dividing by the corresponding sampling rate.

A corresponding reference waveform is calculated from a continuous portion of the waveform data with an appropriate length N, according to the number of data points being sampled. The calculation begins at an appropriate point $k_0$ to include a region of sufficient size of the signature in the measured waveform of a magnetic target. The following, essentially conical cosine window function w(n) is used in order to suppress the values present at the boundaries of the window as much as possible:

$$REF(n)|n=0 \ldots N-1 = S(k_0+n)w(n).$$

The corresponding, complex reference waveform CREF (n) is then composed of the reference waveform REF(n) (as its real part) and its Hilbert transform (as its imaginary part) as follows:

$$CREF(n) = REF(n) + iH(REF)(n).$$

For the cross-correlation function between the complex reference waveform and the measured waveform, S(k) can be written as follows:

$$(CREF \otimes S)(k) = \sum_{n=0}^{N-1} CREF^*(n)S(n - N + k) =$$

$$= \sum_{n=0}^{N-1} Re(CREF(n))S(n - N + k) - i$$

$$\sum_{n=0}^{N-1} Im(CREF(n))S(n - N + k) =$$

$$= \sum_{n=0}^{N-1} REF(n)S(n - N + k) - i$$

$$\sum_{n=0}^{N-1} H(REF)(n)S(n - N + k) =$$

$$= (REF \otimes S)(k) + iH(REF \otimes S)(k)$$

$$= CC(k) + iH(CC)(k) = CCC^*(k),$$

where CC(k) represents the cross-correlation of the real part of the discrete, time-dependent complex reference function CREF(n) and the also discrete time-dependent measured waveform S(k). The measured data points of the waveform, which are variously indexed with negative values, are treated as zero values, meaning that the waveform should have the value zero before the measurement begins.

Regarding the further notation used in the aforementioned equations, the following applies:

The quantity (or variable) n represents the index of the data points of the complex reference waveform, which is formed from N data points or samples. The quantity (or variable) k runs over the data points of the measured waveform, the cross-correlation waveform and the complex cross-correlation waveform. It should be noted that in FIGS. 6A-6C the horizontal axis mostly represents time, wherein the only area or region in which this time corresponds to the actual measurement time or period corresponds to the measured waveform. However, for the reference waveform, the quantity time is the relative time corresponding to a waveform data point within the time window of the reference waveform.

In the area or region of the complex cross-correlation waveform, the envelope waveform and the instantaneous phase waveform, the time axis is shifted towards positive values so that the calculation of the cross-correlation waveform only takes place for samples that precede it in time. However, this time shift is constant and has no effect on the evaluation of the envelope and instantaneous phase waveforms.

Figure 6A:
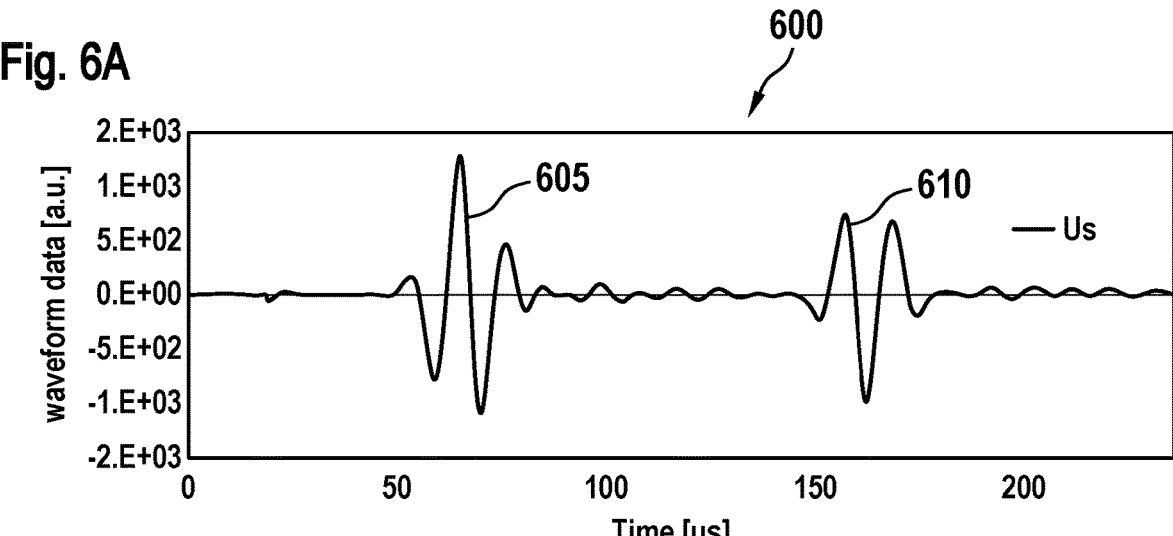
FIG. 6A-C show recorded wave forms in the case of two different and differently aligned target magnets.
Figure 6B:
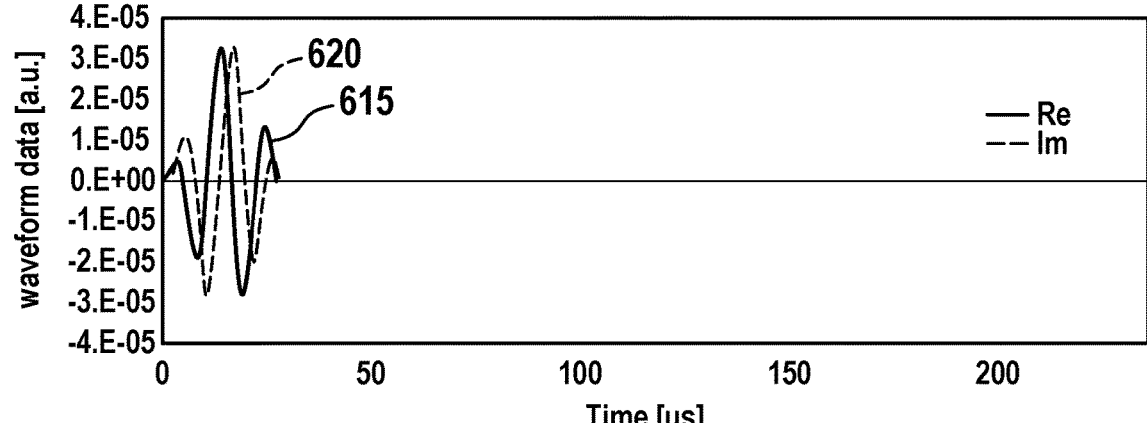
Figure 6C:
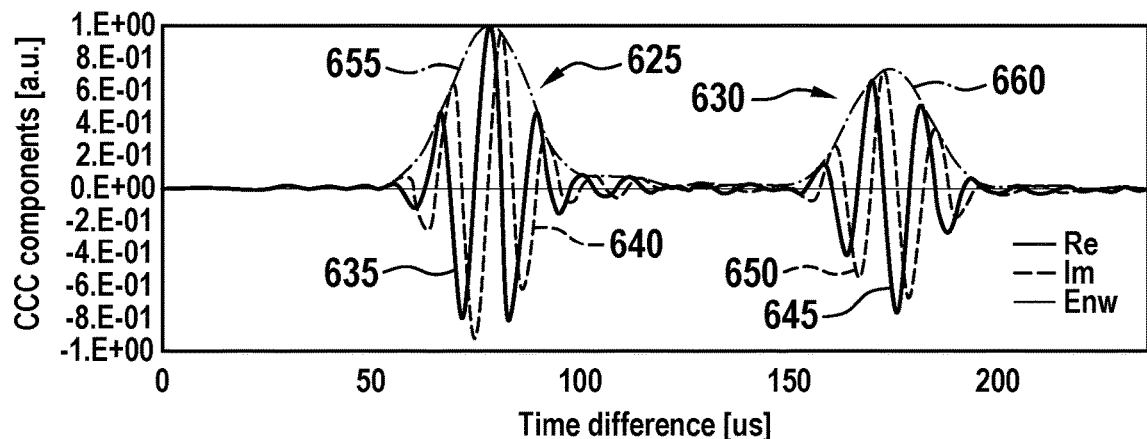

While this temporal shift is visible in FIGS. 6A-6C, it is graphically compensated for in the remaining figures to better visualize the matching of the measured features of the waveform and the features of the corresponding complex cross-correlation waveform and envelope.

The complex conjugation only has the effect of inverting the imaginary part of the components of the CCC waveform and thus the phase, although the quantities (CREF⊗S)(k) and CCC* (k) can be used equivalently.

In this example, the quantity CCC(k) is calculated as follows:

$$= \sum_{n=0}^{N-1} Re(CREF(n))S(n - N + k) + i \sum_{n=0}^{N-1} Im(CREF(n))S(n - N + k).$$

The measured waveform S(k) is shown in FIG. 6A. FIG. 6B depicts the real and imaginary parts of the complex reference waveform. In FIG. 6C, the real and imaginary parts of the quantity CCC(k) are shown with corresponding solid or dashed lines.

The envelope waveform data points are calculated as the absolute values of the respective CCC envelope waveform data points. The real and imaginary parts as well as the envelope of the quantity CCC are not assigned with corresponding numbers overall, but only their features which correspond to the first and the second target magnet and which are formed or represented by the two wave groups 625-635-640-655 and 630-645-650-660 shown in FIG. 6C.

The complex cross-correlation signal can be transformed by means of an FIR filter. So-called "FIR" filters ("Finite Impulse Response" filters) are feedback-free, phase linear digital filters having finite pulse response.

The mathematical calculation of the complex cross-correlation signal can also be optimised by using an FIR filter, wherein values of the complex reference wave form are used as filter constants. A complex cross-correlation wave form can thus be generated with a minimum delay, or even in real time, e.g., if an architecture working in parallel (e.g., an FPGA) or a suitable hardware-implemented filter bank is used.

It should be noted that in this approach, the Hilbert transform is carried out only once, specifically when the complex reference wave form is generated, but not every time a cross-correlation wave form is calculated. In addition, the Hilbert transform is only implemented for short signal forms ("samples"), e.g., of a typically relatively short target wave form, but not for relatively long signal forms, e.g., a cross-correlation wave form.

The approach described as the following advantages in relation to the prior art, for example:

significantly reducing the requirements for saving the data of recorded signal forms;

significantly shortening the processing time of the data calculated from the recorded signal forms;

simultaneously calculating the complex cross-correlation signal and start of the recording of signals without having to completely store the recorded signals or corresponding wave forms;

simultaneously calculating the phase angle values and calculating the complex cross-correlation wave form. The linear regression to the phase angle over time can also run simultaneously. Estimates of the target position of the respective target magnet can also be calculated during this process or directly after a target wave form is received or is available.

Figure 4:
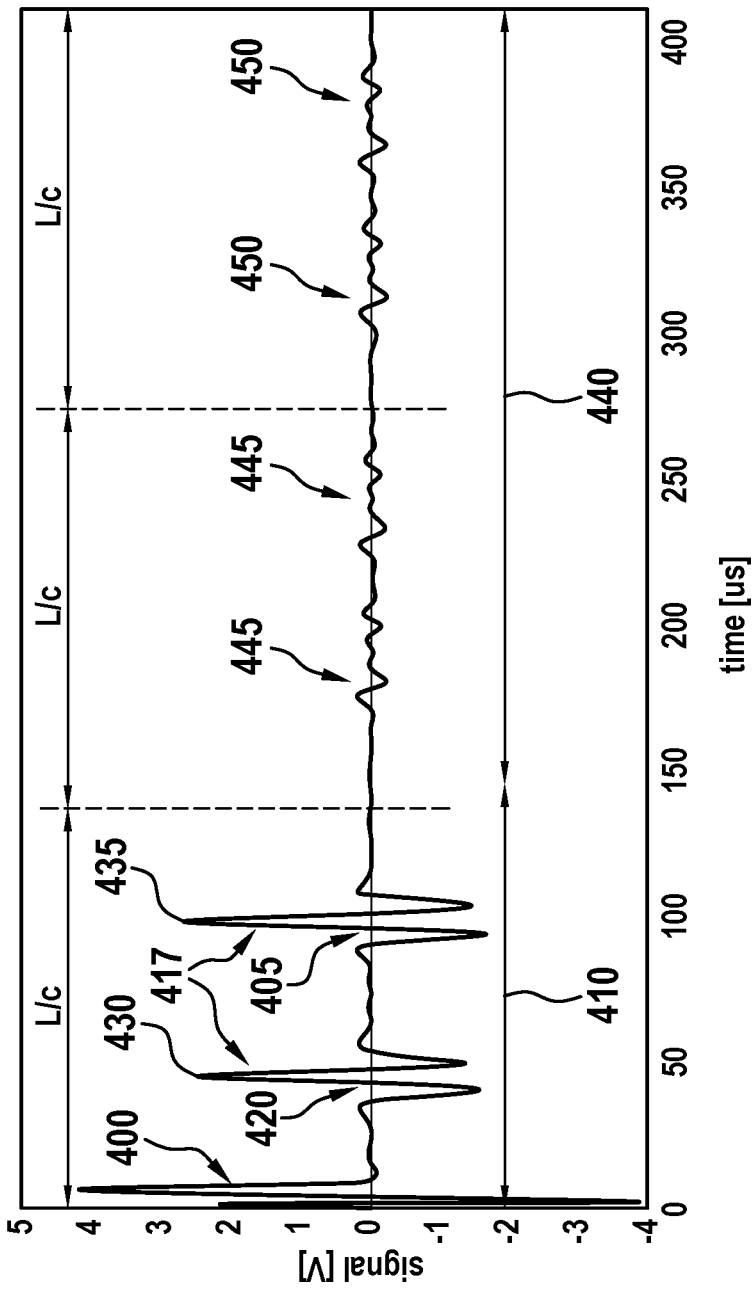
FIG. 4 shows a typical temporal course or the "anatomy" of a digitalised measurement signal in question or a correspondingly recorded wave form.

The precise temporal course of a digitalised measurement signal as described, i.e., the "anatomy" of the sensor signal or of the recorded wave form, is depicted in FIG. 4. In this depiction, the time axis begins at the rising flank 400 of an interrogation pulse ("init signal") (not depicted here) that is approx. 4 µs long. The relatively large oscillation signal 400 at the start of the entire wave form 410 arises due to a large mechanical and magnetic disturbance (also not depicted here), which is caused by the electrical interrogation current and the simultaneous magnetostrictive reaction of the entire waveguide.

If not explicitly specified, the exemplary wave forms shown here are or have been recorded by a 12-bit analogue-to-digital converter at a sampling rate of 5.333 MHz.

In the present case, two target magnets ("targets") are arranged radially in the proximity of the waveguide (see FIGS. 1 and 2). Although the magnetic field of the target magnets theoretically extends infinitely, it quickly fades if the distance lies below the perceptibility limit due to background noise, such that the signals caused by the target magnets can be treated as spatially limited features of the entire recorded wave form. The signals resulting due to the two target magnets are combined as an overlay of two individual physical signals.

On the one hand, the target magnet causes two torsional waves due to the specified interrogation pulse, which begin to propagate in both directions along the waveguide. At this moment, the corresponding "wavelet" propagating up to the measurement pick-up is relevant. If the wave for a radially aligned target magnet propagates through the pick-up zone of the measurement pick-up, the measurement pick-up experiences a substantially anti-symmetric, temporally induced voltage. "Anti-symmetric" should here be understood to mean that the signal-time function is anti-symmetric with respect to the mid-point of the voltage pattern corresponding to the target magnet.

The specified second (echo) signal 440 is created by reflection, as after the torsional wave has been recorded by the measurement pick-up, the torsional wave is immediately reflected from the free, i.e., undamped and unbuffered near end of the waveguide. The reflected waves induce voltage signals 445, 450 in the waveguide in turn via the two target magnets, much like the previous voltage signal, but having a somewhat smaller amplitude and reversed polarity.

It should be noted that the position of the measurement pick-up in relation to the free end of the waveguide is optimised such that the two voltage signals generate a constructive overlay that causes the high peak values 430, 435 of the signals caused by the two target magnets.

By the approach previously described, it is ensured that the signal caused by the target magnet is practically a zero average pattern or has a zero average course.

The second torsional wave, which propagates to the far, damped end of the waveguide, is damped and reflected to the near end and recorded again as an echo signal 445. After the first torsional wave has reached the near end of the waveguide and has been reflected there, it propagates to the far end and is damped and, due to reflection, reflected back to the near end there, and detected again as a further echo signal 450.

The signals shown in FIG. 4 typically result if the target magnets are arranged radially. In this Figure, the letters "L" and "c" describe the length of the waveguide or the wave propagation speed in the waveguide. The period of time that the wavelets require to propagate over the entire length of the waveguide is accordingly equal to L/c.

Magnetostrictive position encoders in question can use the increasing zero crossing 420, 425 of the two time signals 417 shown in FIG. 4 directly before the positive main peak value when determining the position of the target magnet. However, this zero crossing must be in addition to further positive zero crossings by further comparators, which recognise the characterising deviations before the main peak value, and a subsequent logic by means of which the generation of a stop signal is only enabled if such preceding deviations have been recognised.

Figure 5A:
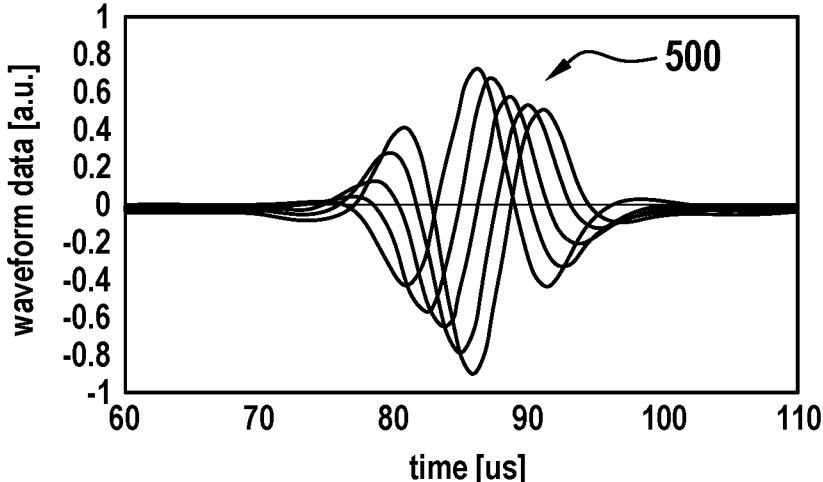
FIG. 5A-B show typical measurement signals or wave forms generated by two different target magnets in question.
Figure 5B:
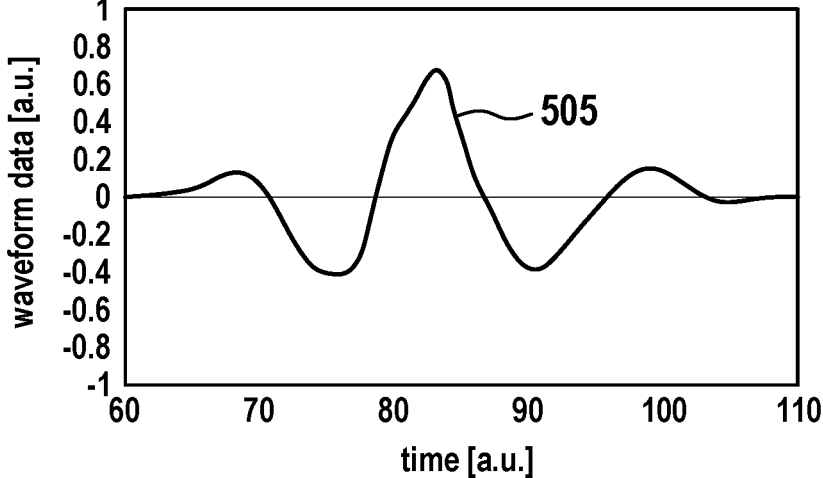

If the alignment of the target magnet deviates from a radial arrangement, either due to an installation error, due to damage or due to an incorrect alignment, or because the target magnet type deviates from the target magnet type preferred in construction (e.g., is produced by a different manufacturer), then no anti-symmetry required to overlay the two signals is present, and the characteristics of the resulting, recorded signal differ from the characteristics of the signal shown in FIG. 4. Thus, for example, a two-pole magnet that is substantially rotated around different axes, wherein the axis is perpendicular both to its magnetic moment and to the waveguide, can generate signals such as the signals 500 shown in FIG. 5A as a target magnet. A target magnet that does not have a two-pole structure can also generate a signal such as the signal 505 shown in FIG. 5B. As shown in FIG. 3B, the wave forms shown in FIGS. 5A and B are changed in turn, e.g., by using a "tapered cosine window", such that the substantially central section of the wave form remains unchanged and can also be used as a reference wave form here.

A specified, recorded wave form 600 of the measurement pick-up is depicted in FIG. 6A, and specifically in the present exemplary embodiment, in which two different and differently aligned target magnets are present. The target wave form 605 of the first target magnet, which can be observed between approx. 50 and 80 µs, is now used to calculate a specified complex reference wave form. The real parts 615 and the imaginary parts 620 of the corresponding complex reference wave form are depicted in FIG. 6B. This complex reference wave form has then been used to calculate the two complex cross-correlation wave forms 625, 630 shown in FIG. 6C.

It should be noted here that the complex reference wave form has been cross-correlated with the completely recorded wave form, which contains the target wave forms 605, 610 both of the first and of the second target magnet. The two sections 625, 630 of the components of the complex cross-correlation wave form that correspond to the first and the second target magnet appear approximately as envelope cosine and sine curves. However, the phase courses of the cosine curves, which correspond to the respective maximum points of their envelope curves, are designed differently, which is due to the two target magnets being arranged with respectively different spatial orientation. Correspondingly, it can be assumed that the maximum value of the envelope curve substantially correlates with the temporal value relevant for the target position.

For the two target magnets, the real parts 635, 645 and the imaginary parts 640, 650 and the envelope curves 655, 660 of the two complex cross-correlation wave forms 625, 630 are depicted in FIG. 6C. Although both the recorded wave form and the complex cross-correlation wave form can be represented on the same horizontal scale (i.e., with regard to the time and the respective sampling value), the horizontal scale of the wave form corresponds to the time, while the horizontal scale of the complex cross-correlation wave form corresponds to the time difference.

The two target magnets appear as two characteristic peak values in the envelope wave form. The start and the end of the sections affected by the target magnet can be defined with reference to instances in which the envelope curve values cross the threshold, wherein the respective threshold values can be dependent on construction or already set when the position measuring device is installed. The threshold values can also be continuously updated on the basis of earlier measurements or on the basis of current measurements.

Figures 7A, 7B, 7C, 7D:
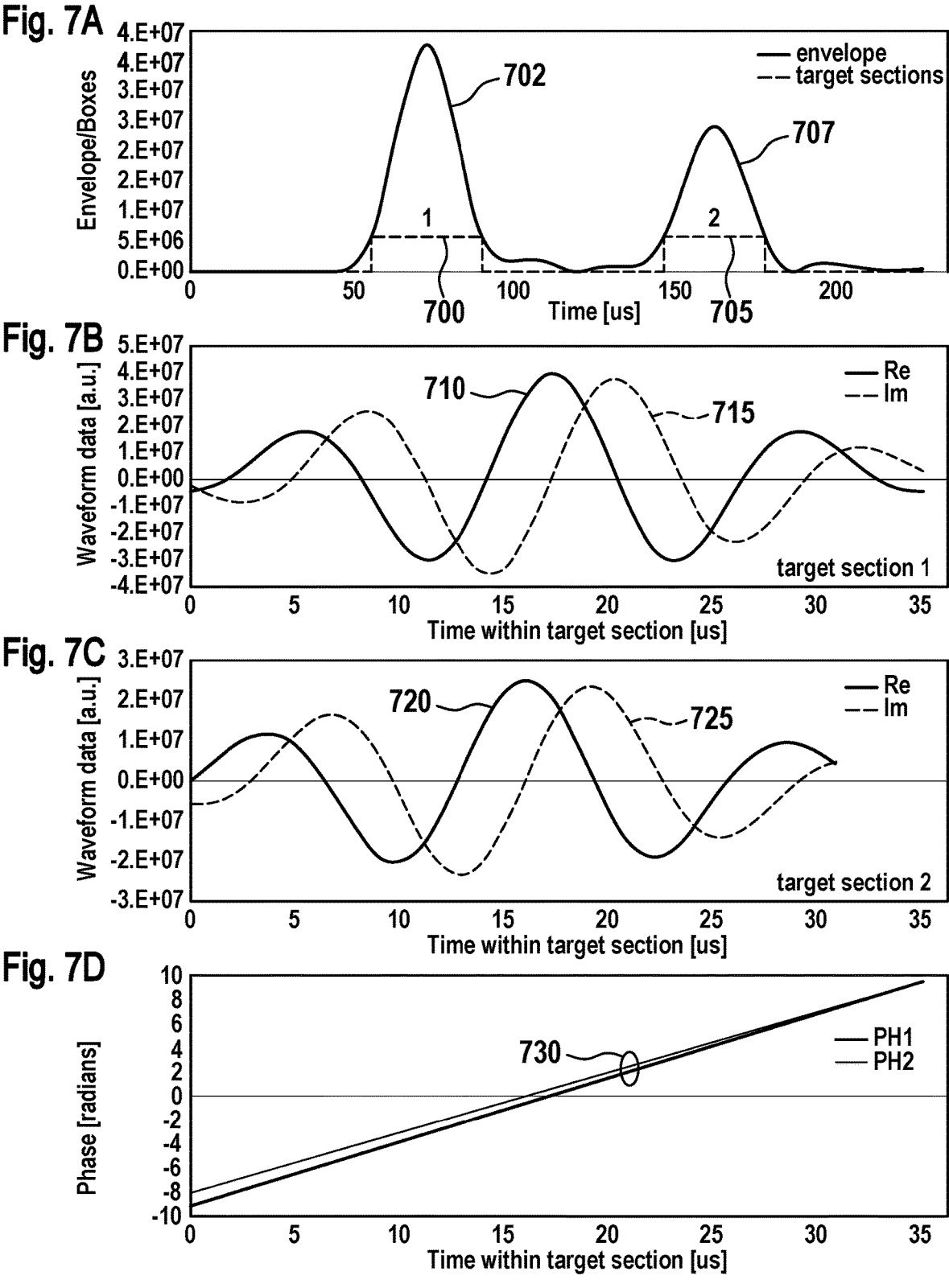
FIG. 7A-D show an identification of affected sections for two different target magnets and the assignment of the identified sections to the first and the second target magnet.

As illustrated in FIG. 7A, the two sections 700, 705 affected by the target magnets are identified and assigned to the first or respectively to the second target magnet. According to the approach according to the invention, these target magnet sections 700, 705 are further processed to precisely locate the target magnets. For this purpose, linear regressions (see FIG. 7D) are carried out to determine the location of any specific level transitions of the phase depending on time within the target magnet sections, and are then added to the position within the target section with reference to the start position of the respective target section.

The corresponding real parts 710, 720 and imaginary parts 715, 725 of the complex cross-correlation wave forms 710, 715 or respectively 720, 725 in the first target section and in the second target section are applied in FIG. 7B or 7C. As can be seen in particular from FIG. 7A, the lengths of the two sections 700, 705 are different, as the two envelope curves 702, 707 have a slightly different shape and height, although the specified threshold value matches.

The suggested method for determining the position of the target magnet within the target section is based on a linear regression of the phase over time. It is assumed that the zero points of the real and imaginary parts of the complex cross-correlation wave forms correspond to phases that are equal to odd or even integer multiples of $\pi/2$, such that the determination of interpolated positions corresponds to a specified phase. However, while a particular number of data points relating to the course of the phase over time (see FIG. 7D) are selected before and after the level crossing of a specified phase value, it is relatively easy to carry out the fit of a line to the data points and the interpolation (see set of curves 730) of the level crossing from the linear fit parameters, unlike the determination of the zero crossing of the respective wave form (i.e., the real or imaginary part of the complex cross-correlation wave form). This is because the selection of the data points that comprise the substantially linear section of the specified wave form can either require a relatively large amount of technical effort or the specified linear section may not even be sufficiently represented by data points due to low sampling rates.

The suggested method is further based on the knowledge that the standard deviation of the position measurement is a linear function of the average of a reciprocal envelope curve.

This is because the complex cross-correlation wave form is generated in the target sections as a cosine function that is multiplied with a Gaussian envelope curve (see FIG. 3C), wherein the gradients of the relevant components of the complex cross-correlation wave forms at the zero crossings are proportional to the envelope curve. Experiments that have been carried out have shown that for a given target magnet, the use of the phase value that corresponds to the maximum of the specified envelope curve enables the most precise measurement of the position of the target magnet. This phase value must be determined and fixed during installation or during a learning process, however, to avoid further dependency on the determination precision of the envelope curve maximum.

Alternatively, during installation or learning, the integer multiple of $\pi/2$ that is closest to the envelope curve maximum can be selected, whereby this integer multiple can then be further used in the normal operation of the position measuring device.

Alternatively, again, the target magnet locations can be routinely determined according to several phase values, e.g., according to more than one integer multiple of $\pi/2$, however, the location is always used that corresponds to the lowest possible standard deviation.

It should be noted that the level transitions need not necessarily be quantised for the integer multiples of $\pi/2$, and instead, any values can substantially be selected.

By localising and following several phase transitions for the target magnets, the position measuring device can be operated with significantly fewer dead zones on both ends, and with a significantly smaller distance between neighbouring target magnets, than a position measuring device based on comparators according to the prior art. As an example, the target wave forms and the positions that correspond to the integer multiples of $\pi/4$ are shown in FIGS. 7A-7D for two target magnets, wherein one target magnet is fixed in a position and the other magnet is moved from approx. 170 mm, to approx. 2 mm. The gradual merging or combination of the two wavelets can be seen in FIG. 8 for the specified actual distances between the target magnets. At a distance of 150 mm, indicated by the dashed line 800, the two wavelets are clearly separated 805 from one another. At a distance of 70 mm marked by the dashed line 810, however, the signal baseline is no longer visible 815 between the target magnets, although the two wavelets can be effectively differentiated from each other.

The two diagrams for the shorter distances show wave forms for which the two target magnets can no longer be clearly differentiated from each other. It should be noted that in the conventional solution, in which the stop signal of the running time measurement is generated by a conditioned comparator, a minimum distance of 70 mm between the target magnets is required for reliably recording both magnets.

Figure 8:
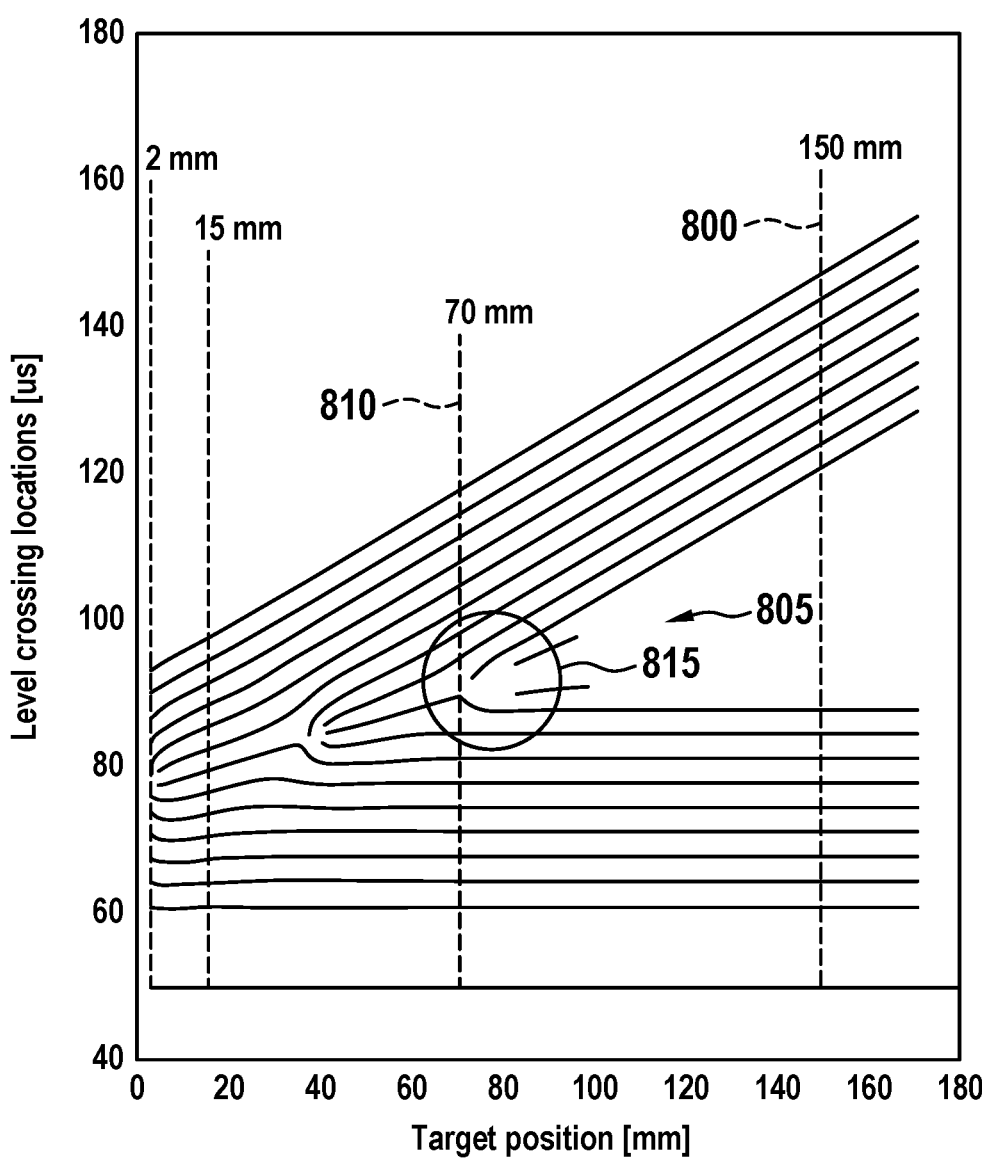
FIG. 8 shows the division according to the invention for two target magnets of target sections into two groups of the two target magnets, specifically on the basis of the target magnets spatially approaching.

The further advantages and possibilities of the method described herein can also be clarified with reference to FIG. 8. For relatively large distances between the two target magnets, the positions that correspond to the phase transitions at integer multiples of $\pi/4$ in the two target sections are divided into two different groups, wherein the group that is assigned to the respectively moving target magnet nears the other group if the distance reduces. If the distance between the two target magnets reduces to less than 70 mm, the position data of the two groups in the region of the collision zone is "blurred", whereby some of the position data even disappears entirely. Depending on the actual target magnet types, orientations and strengths, the position data that comes closest to the envelope curves of the complex correlation course of one of the individual magnets also disappears (which is not the case in the present example, however), or is at least significantly disturbed. There are several positions, however, that are subject to less disturbance, and continuously reflect the actual position of the corresponding target magnets. The determination of the position thus becomes less precise, but the target magnets can still be reliably followed, which significantly improves the operating reliability of the position measuring device. However, it is also practical, but not necessary, for the target magnets to be recorded by the sensors before they come closer to one another.

Figures 9A, 9B, 9C, 9D:
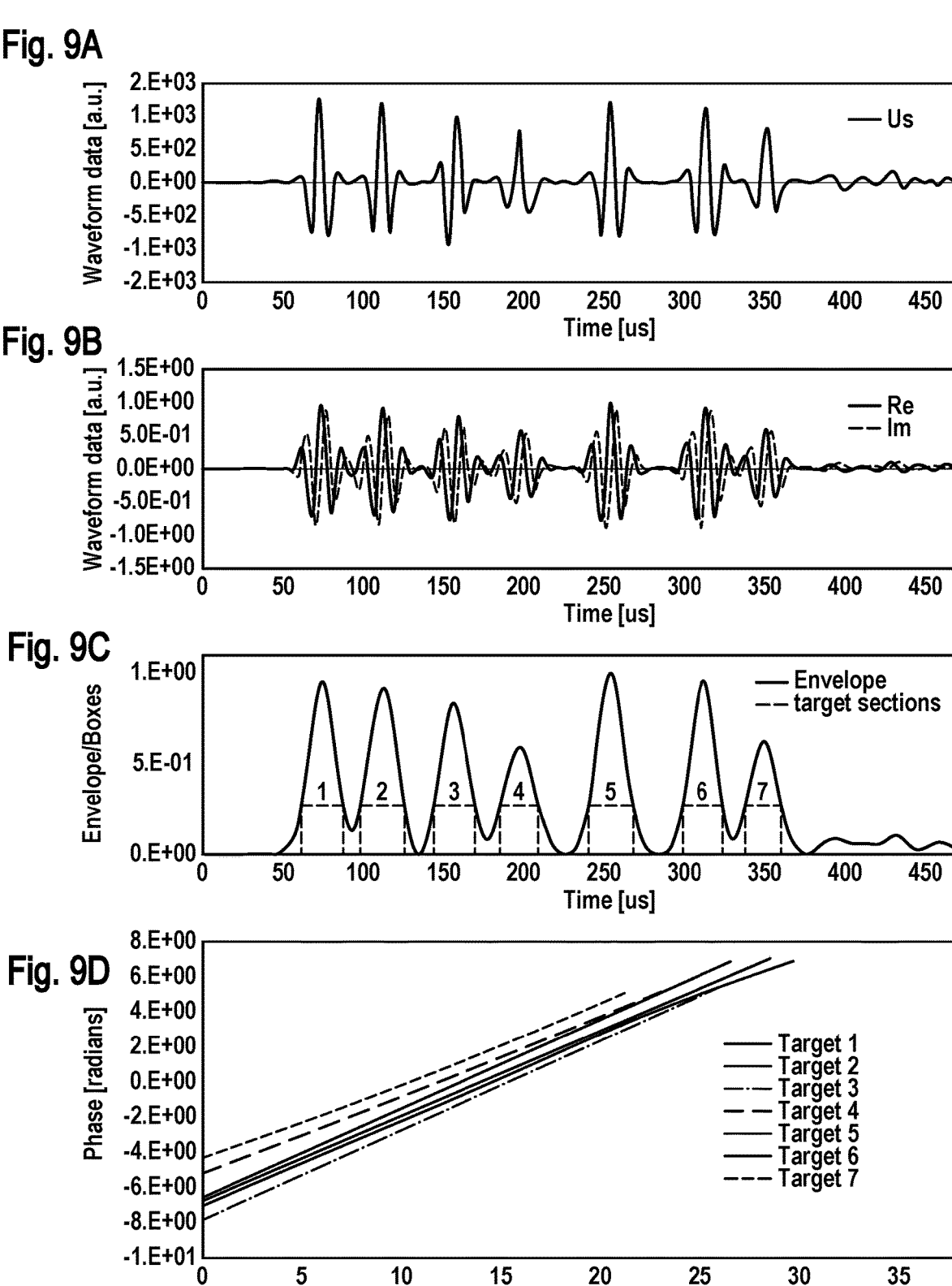
FIG. 9A-D show a wave form recorded by sensors, the components of a complex cross-correlation wave form in relation to the latter and an envelope curve having corresponding target sections.

The method described enables independent measurement with several target magnets and with differently designed target magnets, as depicted in FIGS. 9A-9D. The target magnets given the numbers "1", "2", "5" and "6" in FIG. 9C represent different standard target magnets sold by the applicant, while the target magnet "7" also given in FIG. 9C represents a particular target magnet, also sold by the applicant. Additionally, the target magnet No. "3" also given in FIG. 9C represents a geomagnetic piece. The target magnet No. "4" also given in FIG. 9C, on the other hand, has a non-dipole magnet structure. The length of the waveguide in these measurements was 1.06 m. The recorded wave form, the components of the complex cross-correlation wave form and the envelope curve with the indication of the corresponding target sections are shown in FIGS. 9A-9C. FIG. 9D additionally shows the phases-over-time curves within the respective target sections "1" to "7" specified in FIG. 9G.

The target magnets "1" and "2" shown in FIG. 9D cannot be seen separately from one another or barely at all due to the almost perfect overlap of the respective wave forms. The complex cross-correlation wave form has been calculated using a complex reference wave form that has been calculated from the target wave form of the target magnet No. "1". The lengths of the target sections are different due to the different amplitude ratios. As the target magnets or their orientations are different, the gradients of the respective phase-against-time curves can also be easily distinguished, while the linearity of the phase-over-time curves is always almost perfect. Only slight deviations can be seen for the target magnets "4" and "6" for absolute phase values above the radian value of 3.14 rad, and for the target magnet "6" above the radian value of 4 rad, wherein these phase values can also be influenced by neighbouring target magnets and should thus be excluded in the evaluation.

Consequently, different target magnets can be reliably localised using the same complex reference wave form, i.e., the method described herein has a certain degree of tolerance with regard to the actual form of the complex reference wave form. This enables the construction of synthetic, complex reference wave forms that are optimised for particular aspects. A first aspect can be that the target sections can have as good a separability as possible, for which an oscillating pattern with a relatively narrow envelope curve is advantageous (see FIG. 10C). A further aspect can be reducing the calculation time of the complex cross-correlation wave form as far as possible. This can be implemented by reducing the number of data points of the complex reference wave form, while particular properties, such as the approximate average frequency and the zero average behaviour of the components, can be maintained.

Figures 10A, 10B, 10C, 10D:
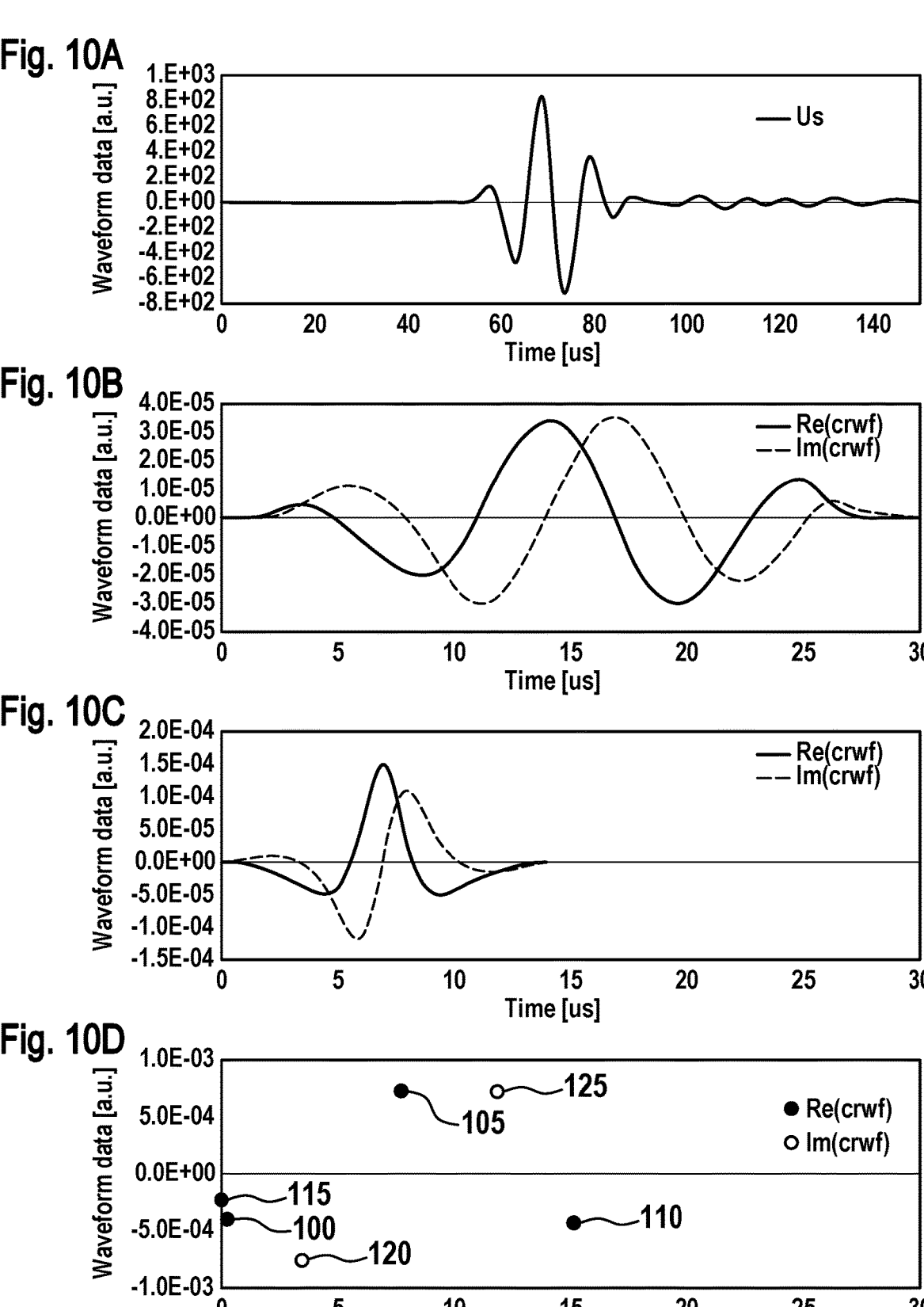
FIG. 10A-G show reference wave forms that are optimised for particular aspects, specifically with regard to separability of target sections of different target magnets and for minimising the calculation time of a complex cross-correlation wave form.

Thus, for example, a complex reference wave form can be constructed, which requires only three additions and two multiplications to calculate the complex cross-correlation wave form, wherein again both the real parts 100, 105, 110 and the imaginary parts 115, 120, 125, are shown in FIG. 10D.

Figures 10E, 10F, 10G:
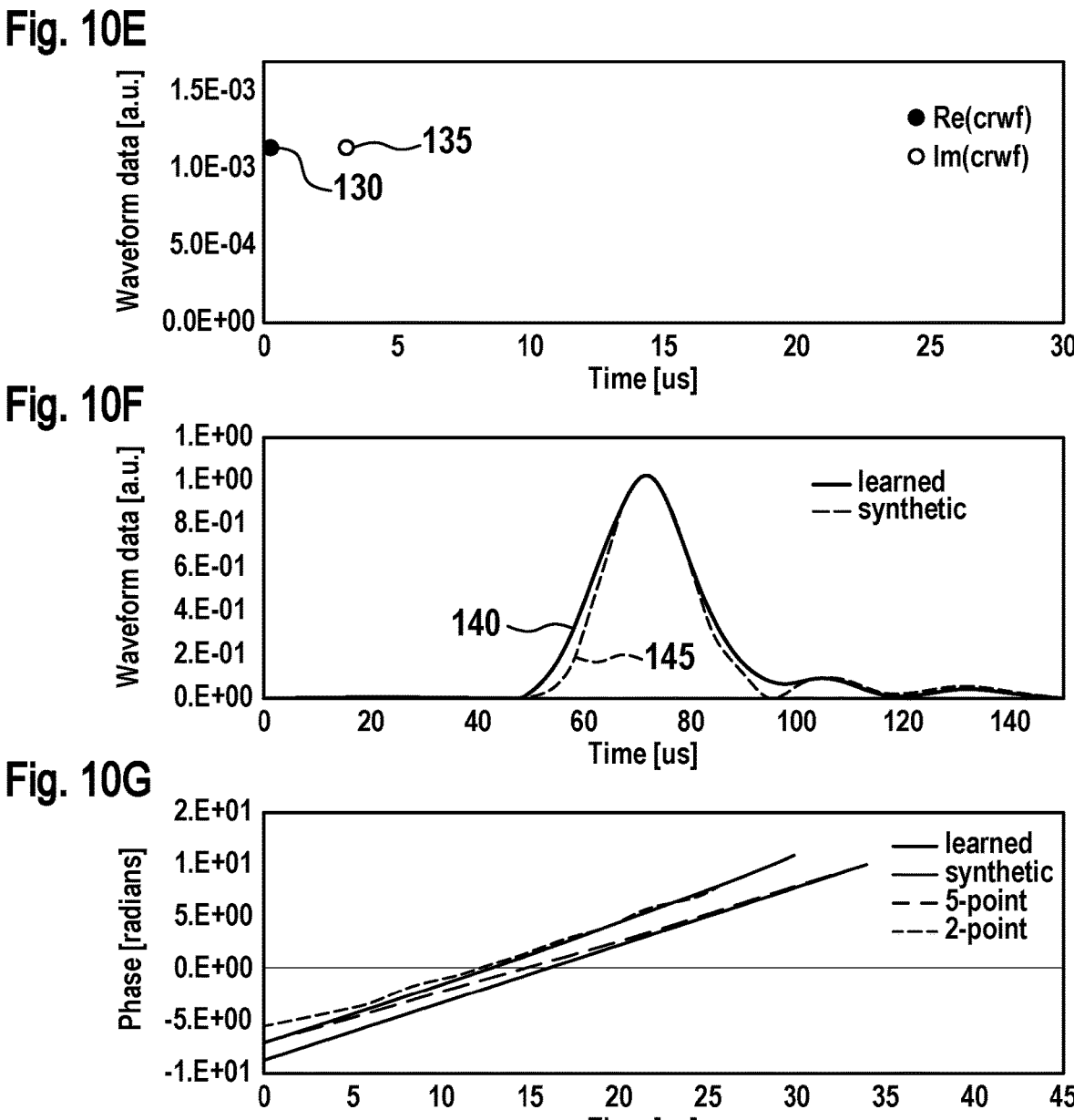

An example of a complex reference wave form with only relatively few data points for the real part 130 and the imaginary part 135 is shown in FIG. 10E. This reference wave form requires no mathematical operations to generate the complex cross-correlation wave form, which is formed from a combination of the recorded wave form as its real part and the time-delayed recorded wave form as its imaginary part (with an opposite sign).

A part of a recorded wave form and a complex reference wave form that has been learned from this recorded wave form are shown in FIGS. 10A and 10B. The envelope curves 140, 145 of the complex cross-correlation of the learned (see FIG. 10B) and the synthetic (see FIG. 10) complex reference wave forms with the recorded wave form shown in FIG. 10A are shown in FIG. 10F. Specifically for the learned complex reference wave forms 140 and for the synthetic complex reference wave forms 145. The respective phase-over-time curves within the respective target sections that are generated by the learned, synthetic, complex reference wave forms are compared with one another in FIG. 10G. For absolute phase values that are not greater than π, the non-linearity error of the phases-over-time curves is 0.08%, 0.48%, 0.60% and 1.77%

The examples in FIGS. 10A, 10C and 10D show complex reference wave forms that have an average value of zero, specifically with regard both to their real and to their imaginary parts. Consequently, the complex cross-correlation wave form cannot be changed with regard to a constant offset of the recorded wave form, and slowly varying components are also efficiently suppressed. This leads to a high tolerance of the position determination with regard to mechanical vibrations and shocks, which normally arise in the frequency range with low kHz.

The examples above have been depicted by wave forms that used recorded data that was recorded with a 12-bit ADC at a sampling rate of 5.333 MHz. The effect of the reduction of the sampling rate on the recorded target wave form (Column 1) and on the complex cross-correlation wave form (Column 2) and on the phase over time (Column 3) is shown in the nine diagrams shown in FIG. 11. The rows "A" to "C" shown correspond to sampling frequencies of 5.333, 1.778 or 1.067, MHz. For each sampling frequency, the complex reference wave form has been calculated again from an actually recorded wave form using the target wave form. In this case, 267 kHz is approximately double 130 kHz, which is also the upper limit of the frequencies contained in the complex cross-correlation wave form.

Figure 12:
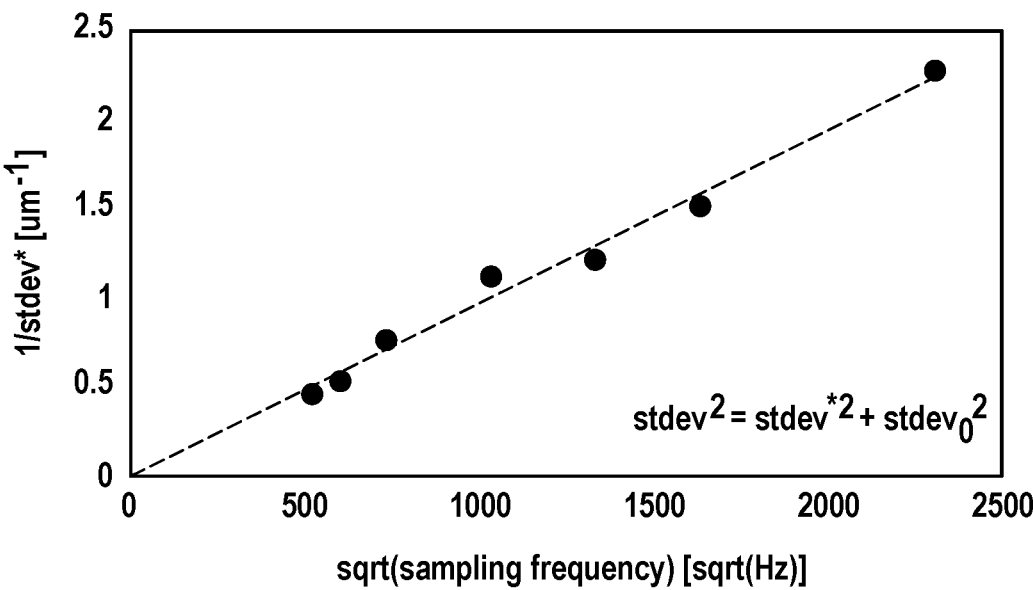
FIG. 12 shows an example for illustrating the locating of an optimal ADC sampling rate to effectively prevent an excessive calculation burden at higher sampling rates and fluctuations in position estimation at lower sampling rates.

A further advantage of using cross-correlations instead of the recorded wave form is efficient noise suppression due to the filter effect of the cross-correlation, which is even more efficient at higher sampling rates. An optimal ADC sampling rate must thus be found to avoid both an excessive calculation burden at higher sampling rates and undesired fluctuations in position estimation at lower sampling rates. An example for the relationship between the minimum standard deviation of the transition point and the actual sampling rate is depicted in FIG. 12.

The method described can be implemented in a process architecture that preferably enables parallel processing of several simultaneous tasks, e.g., in an FPGA ("Field Programmable Gate Array") architecture.

Figure 13:
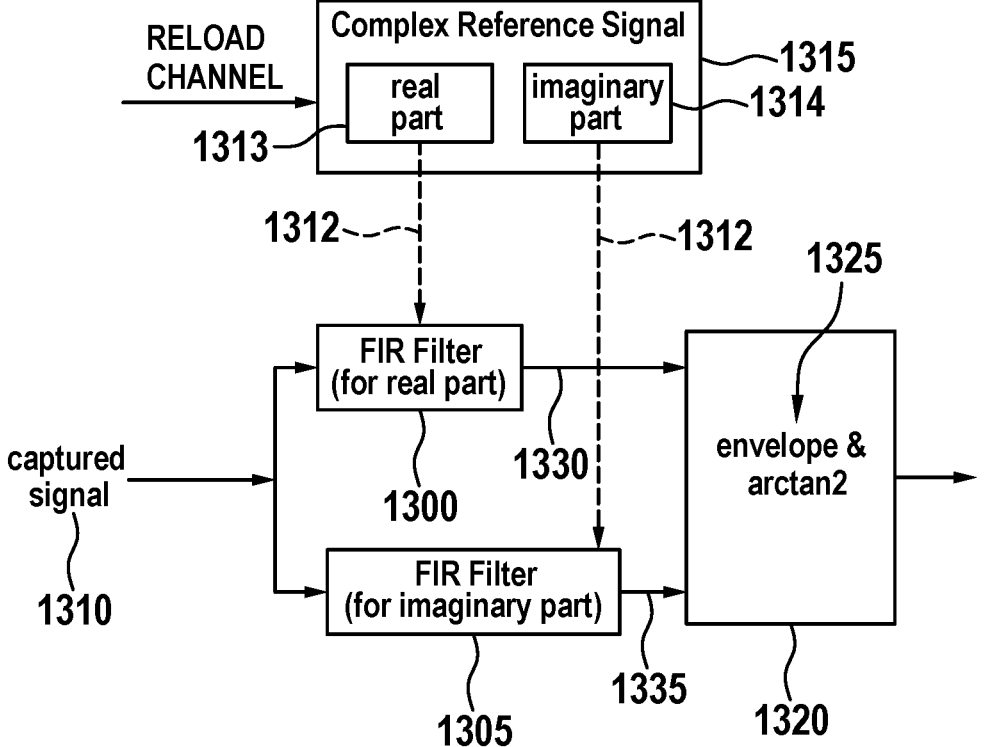
FIG. 13 shows an exemplary technical implementation for calculating a cross-correlation wave form by means of an FPGA ("Field Programmable Gate Array") comprising two FIR filters working in parallel.

As can be seen from FIG. 13, in this exemplary embodiment of an FPGA of the position measuring device in question, the calculation of the cross-correlation wave form is implemented by means of two FIR filters 1300, 1305 ("FIR"=finite impulse response) working in parallel. The sample values of the recorded signal 1310 run through the FIR filter 1300, 1305, wherein the real parts 1313 and the imaginary parts 1314 of the elements of the complex reference wave form 1315 comprise the coefficients 1312 of the two filters 1300, 1305 to generate the real or respectively imaginary parts of the complex correlation wave form 1320.

In turn, the complex cross-correlation wave form can be described in the respective target sections approximately as a cosine function that has been multiplied with an approximately Gaussian envelope curve 1325 (for this purpose, see also the corresponding approach according to FIG. 3C).

The previously described approach enables the real-time calculation of the cross-correlation wave form from the entire recorded wave form, and not only from the signals caused by the target magnet. The entire delay of the availability of the complex cross-correlation wave form data lies in the order of magnitude of the dwell time of the data through the FIR filter. The FPGA preferably works at a frequency that is higher than the sampling rate of the analogue-to-digital converter. Two FPGA domains are thus formed that work at different speeds, such that the same DSP blocks (digital signal processing) can be used for several multiplications to save computing resources.

Some examples of DSP resource requirements for each FIR filter are combined to calculate the cross-correlation in the following table 1. Furthermore, the reduction of the sampling rate not only saves DSP resources, but also BRAM (Block RAM) resources for storing the signal/correlation sequence.

TABLE 1

| ADC sampling frequency [MHz] | Length of the complex reference signal [Samples] | FPGA clock frequency [MHz] | Number of necessary DSP |
|---|---|---|---|
| 12.5 | 350 | 125 | 36 |
| 12.5 | 350 | 12.5 | 350 |
| 12.5 | 350 | 200 | 23 |
| 5 | 180 | 100 | 10 |
| 2.5 | 90 | 100 | 4 |
| 1 | 45 | 100 | 1 |

In the technical implementation of an FPGA shown in FIG. 13 for calculating a specified complex cross-correlation, the real and imaginary parts of the complex cross-correlation wave form are respectively calculated via the two paths 1330, 1335. The envelope curve and the phase are calculated in the exemplary embodiment by an IP core connected downstream of the two FIR filters 1300, 1305. As is known, such an IP core is a logic or data block that is used to produce a field-programmable gate array (FPGA) or an application-specific integrated circuit (ASIC) for a product.

The power of the FPGA-supported evaluation method enables relatively high position measuring rates of more than 2 kHz for magnetostrictive position sensor applications in question here among other things. However, the calculation of the phase from the complex cross-correlation wave form and the linear regression are the most time-sensitive parts of the evaluation. Examples for the configuration of the FPGA and the corresponding power data are represented in the following Table 2.

The evaluation method can be implemented even more quickly and/or in a more resource-efficient manner via suitable "pipelining" and parallelisation of evaluation steps, whereby the implementation/operating costs of the position measuring device can consequently also be significantly reduced.

Figure 14:
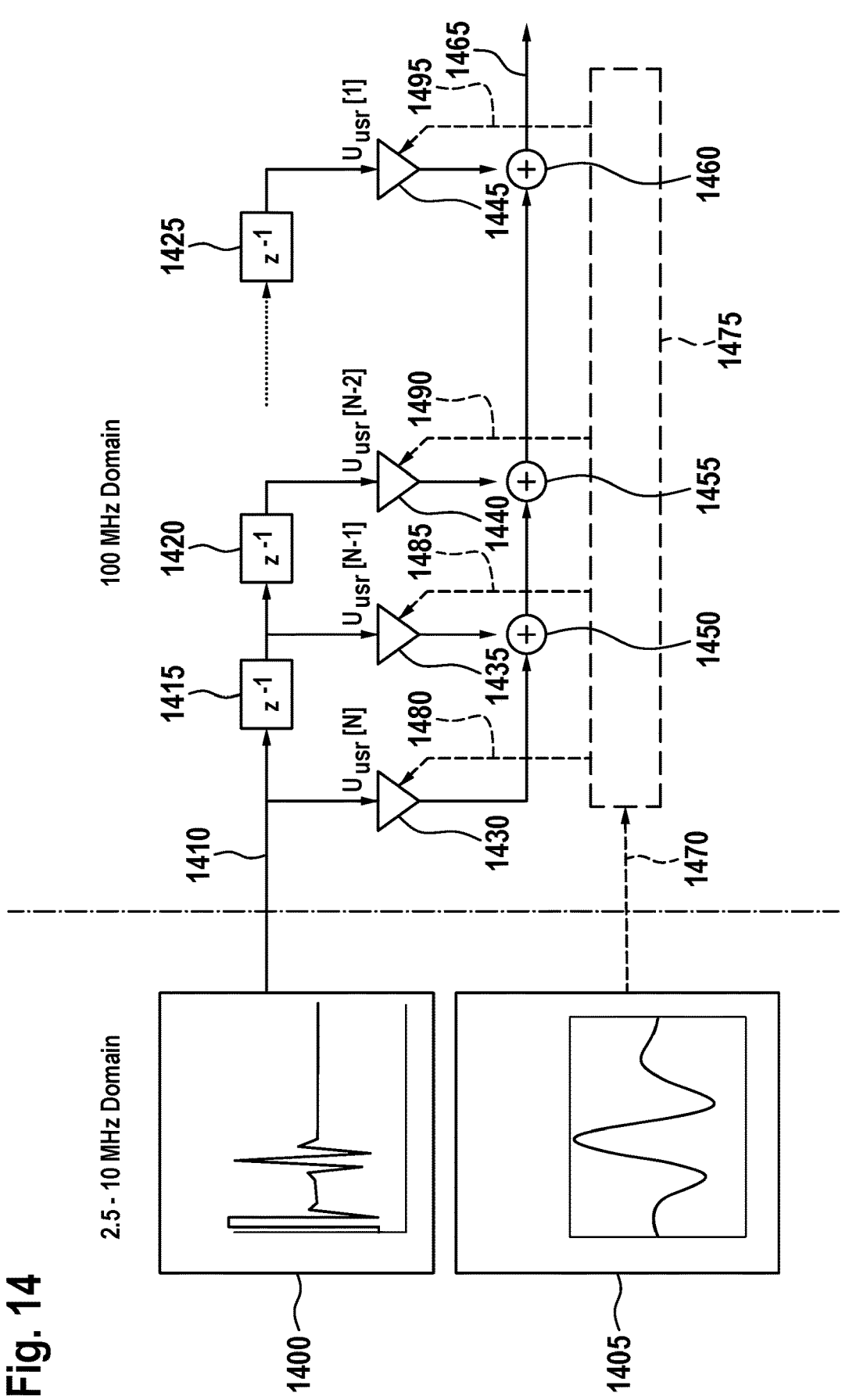
FIG. 14 shows how evaluation can become faster and/or more resource-efficient via suitable "pipelining" and parallelisation of evaluation steps.

FIG. 14 depicts the technical construction of a calculating unit for calculating the real part of a described cross-correlation wave form from a recorded sampling signal 1400 and the real part of a complex reference wave form 1405 formed from the latter as described.

The recorded sampling signal 1400 is added to the actual FIR filter via a data line 1410. An FIR filter consists, in a manner known per se, of delay elements around a sampling step (1415, 1420, 1425), addition nodes (1450, 1455, 1460) and corresponding multiplication units (1430, 1435, 1440, 1445), which, in the present case, forms a reference wave form 1405 correspondingly multiplied with the recorded and delayed values of the sampling signal 1400, and thus the actual correlation. The reference wave form forms the coefficients of the filter, which are added to corresponding multiplication nodes via data lines 1480, 1485, 1490. The reference signal or the specified complex reference wave form 1405 is split into the individual coefficients within a configuration unit 1475.

The suitable number of delay elements, multiplication units and addition nodes depends on two factors, specifically on the length of the reference signal 1405 on the one hand and on the relationship between the ADC sampling frequency and the clock frequency of the filter on the other hand, as depicted in Table 1.

TABLE 2

| ADC sampling rate | Length of the captured waveform [samples] | Length of the waveguide (with 2850 m/s propagation velocity) | Estimated Algorithm Execution time |
|---|---|---|---|
| 1 MS/s | 256 | 0.73 m | <0.95 μs |
| 1 MS/s | 64 | 0.18 m | <0.90 μs |

Figure 15:
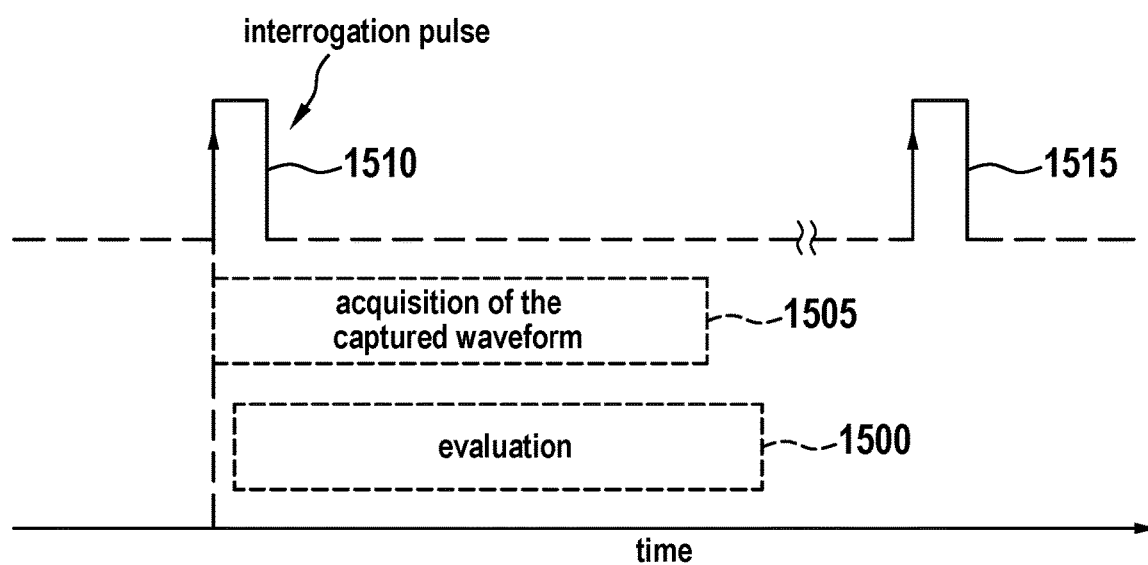
FIG. 15 shows how real-time performance can be achieved in a microcontroller-based evaluation by starting the evaluation of a recorded wave form in parallel with its recording after an interrogation pulse is triggered.

It should be mentioned here that the above parallelisation of the specified calculations is not possible on a microcontroller-based architecture, which makes the requirement for a real-time operation more difficult due to the "one instruction per clock" operation per se. One possibility for still achieving real-time performance is to reduce the number of samples in the recorded wave form by reducing the ADC sampling rate, as already described. Another possibility for still keeping delays due to the specified calculation steps to a minimum consists of the approach illustrated in FIG. 15, according to which the evaluation 1500 of the recorded wave form is started in parallel with its recording 1505 after an interrogation pulse 1510, 1515 is triggered. If such an implementation is implemented in a powerful microcontroller, the calculation cycles do not last much longer than the sampling cycle itself, or are at least comparable with the latter.

It should additionally be mentioned that microcontrollers with DMA support (Direct Memory Access) enable the sampling to be controlled and enable an analogue-to-digital conversion of the sampling signal at the hardware level. Such microcontrollers also enable a conversion result to be stored in an RAM storage device without the intervention of the CPU, which can already work on the storage for available points of the recorded wave form.

On the one hand, it should be noted that the method previously described can be implemented in a purely software-based, magnetostrictive position measuring device on the basis of the described evaluation of a signal wave form in question. The method previously described can also be added in a conventional, comparator-based, magnetostrictive position measuring device as a functional extension, i.e., with minimal hardware complexity.

It should further be noted that the method previously described and the device previously described can also be used with the specified advantages in ultrasound-based position measuring devices specified in the introduction and in such position measurement devices, also specified in the introduction, in which a liquid velocity measurement is implemented on a flowing liquid. In these measuring systems, an ultrasound transmitter transmits an ultrasound wave packet when an initialisation signal is present, wherein, instead of a specified target magnet, a target object that can be recorded via ultrasound is provided, the position or the distance of which should be determined via ultrasound technology. The ultrasound wave propagates in a medium, instead of in a previously described waveguide, at a particular speed. By means of an ultrasound receiver, the received ultrasound signal is transformed into an electronic signal. The then present electronic signal is also evaluated by means of an electronic circuit. In this measurement system too, the position or distance recording task is transformed into a time measurement task.

The invention claimed is:

1. A method for operating an electromagnetic, magnetostrictive, or acoustic position measuring device comprising at least one position sensor, at least one position encoder and a waveguide, said position measuring device further comprising a control device for triggering an interrogation pulse in the waveguide and an evaluation unit for evaluating a wave form recorded by the position sensor, said method comprising:

measuring a time between triggering of the interrogation pulse and a point in time at which the wave form recorded by the position sensor is recorded to determine a position of the position encoder via a relationship between distance and time;

implementing position recognition by means of the position encoder by localising patterns in the wave form recorded by the position sensor;

implementing localisation of such patterns on a basis of correlation observations; and transforming a complex cross-correlation wave form characterising the position encoder at least into another wave form.

2. The method according to claim 1, the complex cross-correlation waveform is converted into an envelope and into instantaneous phase waveforms.

3. The method according to claim 1, an autonomous position recognition of the position encoder is carried out by means of machine learning using the transformed wave form.

4. The method according to claim 3, wherein a complex cross-correlation is generated between a complex or real reference wave form created in advance of the position measuring device starting and a wave form recorded by the position sensor.

5. The method according to claim 4, wherein a real reference wave form is generated by learning a targeted section of the recorded wave form, and specifically by using a window function, and/or in that a complex reference wave form is generated from a/the learned real reference wave form as its real part and from a Hilbert transform of the real reference wave form as its imaginary part.

6. The method according to claim 5, wherein the imaginary part of a complex reference wave form is cross-correlated with the recorded wave form, specifically as an imaginary part of the complex cross-correlation wave form, or in that the real part of the complex reference wave form is cross-correlated with the recorded wave form, specifically as a real part of the complex cross-correlation wave form.

7. The method according to claim 5, wherein the imaginary part of the complex cross-correlation wave form is generated via a Hilbert transform of the cross-correlation of the real reference wave form with the recorded wave form.

8. The method according to claim 7, wherein wave forms recorded by the position sensor are updated after every interrogation by means of an interrogation pulse.

9. The method according to claim 8, wherein a repeated sampling of the position encoder at an empirically predetermined rate begins synchronously with the onset of the interrogation pulse.

10. The method according to claim 8, wherein interrogation noise caused by the interrogation pulse is excluded from a wave form recorded by the position sensor by discarding wave form data that is influenced by interrogation noise or by replacing corresponding wave form data with zero.

11. The method according to claim 3, wherein the complex reference wave form is created by extracting and storing a target wave form from a recorded wave form.

12. The method according to claim 11, wherein the two ends of the stored target wave form are suppressed by using a window function, in particular a tapering cosine window with a parameter that ensures that the central part of the wave form remains substantially unchanged.

13. The method according to claim 1, wherein an envelope curve and a current phase of the cross-correlation wave form are determined.

14. The method according to claim 13, wherein the wave form recorded by the position sensor is evaluated in real time, in parallel with the recording of the wave form.

15. The method according to claim 1, wherein the complex cross-correlation wave form is calculated by means of at least one finite impulse response filter.

16. An evaluation unit for operating an electromagnetic, in particular magnetostrictive, or acoustic position measuring device comprising at least one position sensor, at least one position encoder and a waveguide, said position measuring device comprising a control device for generating an interrogation pulse in the waveguide and an evaluation unit for evaluating a wave form delivered by the position sensor, said evaluation unit comprising:

calculation means for generating a complex reference wave form and for calculating the position of the position encoder by measuring a time between triggering of the interrogation pulse and a point in time at which a wave form recorded by the position sensor is recorded to determine a position of the position encoder via a relationship between distance and time, by implementing position recognition by means of the position encoder by localising patterns in the wave form recorded by the position sensor, by implementing localisation of such patterns on a basis of correlation observations, and by transforming a complex cross-correlation wave form characterising the position encoder at least into another wave form.

17. The evaluation unit according to claim 16, wherein two finite impulse response filters working in parallel to calculate a complex cross-correlation wave form, wherein sampling values of a recorded wave form pass through the two finite impulse response filters, and wherein the real parts and the imaginary parts of elements of a complex reference wave form comprise coefficients of the two finite impulse response filters to generate the real or imaginary parts of the complex cross-correlation wave form.

18. A position measuring device for electromagnetically, in particular magnetostrictively, or acoustically measuring positions, comprising at least one position sensor, at least one position encoder and a waveguide, said position measuring device comprising a control device for generating an interrogation pulse in the waveguide, said position measuring device comprising:

an evaluation unit for evaluating a wave form delivered by the position sensor comprising calculation means for generating a complex reference wave form and for calculating the position of the position encoder by measuring a time between triggering of the interrogation pulse and a point in time at which a wave form recorded by the position sensor is recorded to determine a position of the position encoder via a relationship between distance and time, by implementing position recognition by means of the position encoder by localising patterns in the wave form recorded by the position sensor, by implementing localisation of such patterns on a basis of correlation observations, and by transforming a complex cross-correlation wave form characterising the position encoder at least into another wave form.

* * * * *